(12) United States Patent
Wang et al.

(10) Patent No.: US 12,364,964 B2
(45) Date of Patent: *Jul. 22, 2025

(54) SYSTEM AND PROCESS WITH ASSISTED GAS FLOW INSIDE A REACTION CHAMBER

(71) Applicant: eJoule, Inc., Fremont, CA (US)

(72) Inventors: Yan Wang, Sunnyvale, CA (US); Lu Yang, Fremont, CA (US); Liang-Yuh Chen, Saratoga, CA (US)

(*) Notice: Subject to any disclaimer, the term of this patent is extended or adjusted under 35 U.S.C. 154(b) by 94 days.

This patent is subject to a terminal disclaimer.

(21) Appl. No.: 18/139,881

(22) Filed: Apr. 26, 2023

(65) Prior Publication Data

US 2024/0075451 A1 Mar. 7, 2024

Related U.S. Application Data

(63) Continuation of application No. 16/914,458, filed on Jun. 28, 2020, now Pat. No. 11,673,112.

(Continued)

(51) Int. Cl.
 *B01J 19/26* (2006.01)
 *B01J 10/00* (2006.01)
 (Continued)

(52) U.S. Cl.
 CPC ............. *B01J 19/26* (2013.01); *B01J 10/00* (2013.01); *B01J 19/0013* (2013.01);
 (Continued)

(58) Field of Classification Search
 CPC ...... B01J 4/00–002; B01J 10/00; B01J 19/00; B01J 19/0006; B01J 19/0013; B01J 19/24;
 (Continued)

(56) References Cited

U.S. PATENT DOCUMENTS 3,408,164 A 10/1968 Johnson
4,085,197 A 4/1978 Cheng
(Continued)

FOREIGN PATENT DOCUMENTS

| CN | 101410684 A | 4/2009 |
| CN | 201482483 U | 5/2010 |
| CN | 103962058 A | 8/2014 |
| CN | 104870074 A | 8/2015 |
| CN | 105990569 A | 10/2016 |
| CN | 105990569 B | 10/2018 |

(Continued)

OTHER PUBLICATIONS

Machine translation of JP_2003229124_A (Year: 2003).*

(Continued)

*Primary Examiner* — Natasha E Young
(74) *Attorney, Agent, or Firm* — Ya-Fen Chen; JAS LAW LLP

(57) ABSTRACT

A processing system and method of producing a particulate material are provided. The processing system includes a system inlet connected to one or more gas lines to deliver one or more gases into the processing system, a buffer chamber, a dispersion chamber, a heating assembly, a reaction chamber and a system outlet for delivering particulate material out of the processing system. The method includes delivering one or more gases via a system inlet into a buffer chamber of a processing system, jetting a liquid mixture into one or more streams of droplets using one or more power jet modules into the processing system, delivering flows of one or more heated gases via a heating assembly, forming a reaction mixture and processing the reaction mixture at a reaction temperature into a product material inside the reaction chamber.

18 Claims, 10 Drawing Sheets

Related U.S. Application Data

(60) Provisional application No. 62/868,843, filed on Jun. 28, 2019.

(51) Int. Cl.
  *B01J 19/00* (2006.01)
  *C01B 13/34* (2006.01)

(52) U.S. Cl.
  CPC ..... *C01B 13/34* (2013.01); *B01J 2219/00076* (2013.01); *C01P 2006/40* (2013.01)

(58) Field of Classification Search
  CPC .... B01J 19/2405; B01J 19/26; B01J 2219/00; B01J 2219/00049; B01J 2219/00051; B01J 2219/00074; B01J 2219/00076; B01J 2219/00123; B01J 2219/00132; B01J 2219/00135; B01J 2219/00157; B01J 2219/18; B01J 2219/185; B01J 2219/19–1943; B01J 2219/1946; C01B 13/00; C01B 13/14; C01B 13/34; C01G 53/00; C01G 53/40–50; C01P 2004/00; C01P 2004/50; C01P 2006/00; C01P 2006/40
  See application file for complete search history.

(56) References Cited

U.S. PATENT DOCUMENTS

| | | | |
|---|---|---|---|
| 5,009,854 A | 4/1991 | Jones, Jr. |
| 5,308,585 A | 5/1994 | Stroder et al. |
| 5,372,096 A | 12/1994 | Skowyra |
| 5,406,914 A | 4/1995 | Hyppanen |
| 5,425,412 A | 6/1995 | Hyppanen |
| 5,443,809 A | 8/1995 | Olsen |
| 5,589,300 A | 12/1996 | Fauteux et al. |
| 5,770,018 A | 6/1998 | Saidi |
| 5,910,382 A | 6/1999 | Goodenough et al. |
| 5,928,405 A | 7/1999 | Ranade et al. |
| 5,952,125 A | 9/1999 | Bi et al. |
| 5,983,840 A | 11/1999 | Riccius et al. |
| 6,203,944 B1 | 3/2001 | Turner et al. |
| 6,383,235 B1 | 5/2002 | Maegawa et al. |
| 6,409,984 B1 | 6/2002 | Hattori et al. |
| 6,432,583 B1 | 8/2002 | Fukuda et al. |
| 6,444,009 B1 | 9/2002 | Liu et al. |
| 6,485,693 B1 | 11/2002 | Morgan |
| 6,511,516 B1 | 1/2003 | Johnson et al. |
| 6,582,481 B1 | 6/2003 | Erbil |
| 6,685,762 B1 | 2/2004 | Brewster et al. |
| 6,685,804 B1 | 2/2004 | Ikeda et al. |
| 6,699,297 B1 | 3/2004 | Yamawaki et al. |
| 6,699,336 B2 | 3/2004 | Turner et al. |
| 6,770,226 B2 | 8/2004 | Hampden-Smith et al. |
| 6,902,745 B2 | 6/2005 | Lee et al. |
| 6,916,578 B2 | 7/2005 | Funabiki et al. |
| 6,926,877 B2 | 8/2005 | Green |
| 6,964,828 B2 | 11/2005 | Lu et al. |
| 6,974,566 B2 | 12/2005 | Sabacky et al. |
| 7,008,606 B2 | 3/2006 | Misra et al. |
| 7,008,608 B2 | 3/2006 | Park et al. |
| 7,211,237 B2 | 5/2007 | Eberman et |
| 7,241,532 B2 | 7/2007 | Kikuchi et al. |
| 7,381,496 B2 | 6/2008 | Onnerud et al. |
| 7,393,476 B2 | 7/2008 | Shiozaki et al. |
| 7,429,435 B2 | 9/2008 | Nakane et al. |
| 7,629,084 B2 | 12/2009 | Chang |
| 7,713,662 B2 | 5/2010 | Tabuchi et al. |
| 7,718,319 B2 | 5/2010 | Manthiram et al. |
| 7,722,687 B2 | 5/2010 | Hampden-Smith et al. |
| 7,771,877 B2 | 8/2010 | Paulsen et al. |
| 7,824,802 B2 | 11/2010 | Zhang et al. |
| 7,858,233 B2 | 12/2010 | Song et al. |
| 8,007,941 B2 | 8/2011 | Kweon et al. |
| 8,097,363 B2 | 1/2012 | Yuasa et al. |
| 8,137,847 B2 | 3/2012 | Ohzuku et al. |
| 8,153,296 B2 | 4/2012 | Jiang et al. |
| 8,173,301 B2 | 5/2012 | Hiratsuka et al. |
| 8,241,541 B2 | 8/2012 | Vallee et al. |
| 8,287,829 B2 | 10/2012 | Harrison et al. |
| 8,329,071 B2 | 12/2012 | Wang et al. |
| 8,389,160 B2 | 3/2013 | Venkatachalam et al. |
| 9,388,093 B2 | 7/2016 | Luo et al. |
| 9,722,246 B2 | 8/2017 | Noh et al. |
| 11,376,559 B2 | 7/2022 | Wang et al. |
| 2001/0026786 A1 | 10/2001 | Green |
| 2002/0065374 A1 | 5/2002 | Mawson et al. |
| 2005/0260496 A1 | 11/2005 | Ueda et al. |
| 2009/0148764 A1 | 6/2009 | Kwak et al. |
| 2009/0155590 A1 | 6/2009 | Kelder et al. |
| 2009/0297947 A1 | 12/2009 | Deng |
| 2010/0126849 A1 | 5/2010 | Lopatin et al. |
| 2010/0151318 A1 | 6/2010 | Lopatin et al. |
| 2010/0216026 A1 | 8/2010 | Lopatin et al. |
| 2010/0216896 A1 | 8/2010 | Wang et al. |
| 2010/0261071 A1 | 10/2010 | Lopatin et al. |
| 2010/0283012 A1 | 11/2010 | Hibst et al. |
| 2011/0037018 A1 | 2/2011 | Bruce |
| 2011/0037019 A1 | 2/2011 | Nakano et al. |
| 2011/0045170 A1 | 2/2011 | Shang et al. |
| 2011/0049443 A1 | 3/2011 | Hibst et al. |
| 2011/0052484 A1 | 3/2011 | Krampitz et al. |
| 2011/0129732 A1 | 6/2011 | Bachrach et al. |
| 2011/0171371 A1 | 7/2011 | Li et al. |
| 2011/0210293 A1 | 9/2011 | Liang et al. |
| 2011/0217585 A1 | 9/2011 | Wang et al. |
| 2011/0244277 A1 | 10/2011 | Gordon, II et al. |
| 2011/0272639 A1 | 11/2011 | Bramnik et al. |
| 2011/0274850 A1 | 11/2011 | Yang et al. |
| 2011/0274973 A1 | 11/2011 | Sheem et al. |
| 2011/0274976 A1 | 11/2011 | Blomgren et al. |
| 2011/0291043 A1 | 12/2011 | Wilcox et al. |
| 2011/0305949 A1 | 12/2011 | Nesper et al. |
| 2012/0052347 A1 | 3/2012 | Wilson et al. |
| 2012/0082884 A1 | 4/2012 | Orilall et al. |
| 2012/0168686 A1 | 7/2012 | Metz et al. |
| 2012/0280435 A1 | 11/2012 | Mao et al. |
| 2012/0282522 A1 | 11/2012 | Axelbaum et al. |
| 2012/0282527 A1 | 11/2012 | Amine |
| 2012/0288617 A1 | 11/2012 | Yang et al. |
| 2012/0321815 A1 | 12/2012 | Song et al. |
| 2012/0321953 A1 | 12/2012 | Chen et al. |
| 2013/0004657 A1 | 1/2013 | Xu et al. |
| 2013/0017340 A1 | 1/2013 | Brown et al. |
| 2013/0214200 A1 | 8/2013 | Yang et al. |
| 2014/0328724 A1 | 11/2014 | Chen |
| 2015/0102514 A1 | 4/2015 | Wang et al. |
| 2015/0141240 A1 | 5/2015 | Roller et al. |
| 2017/0305808 A1 | 10/2017 | Anderson et al. |
| 2018/0111139 A1 | 4/2018 | Find et al. |

FOREIGN PATENT DOCUMENTS

| | | | |
|---|---|---|---|
| JP | 5153027 B2 | | 8/2000 |
| JP | 2000279796 A | | 10/2000 |
| JP | 2003229124 A | * | 8/2003 |
| JP | 2013047767 A | | 3/2013 |
| JP | 2015186793 A | | 10/2015 |
| KR | 10-2013-0081157 A | | 7/2013 |
| TW | 201111276 A | | 4/2011 |
| TW | 201440884 A | | 11/2014 |
| WO | 2009039281 A2 | | 3/2009 |
| WO | 2013052456 A1 | | 4/2013 |
| WO | 2014159118 A1 | | 10/2014 |

OTHER PUBLICATIONS

Anthony Burrell et al. Applied Battery Research for Transportation. Materials Research; Modeling, Diagnostics, and Performance Studies; Abuse Diagnostics & Mitigation; and Applied Research Facilities. Argonne National Laboratory, Brookhaven National Laboratory, Idaho National Laboratory, Lawrence Berkeley National

(56) References Cited

OTHER PUBLICATIONS

Laboratory, Oak Ridge National Laboratory, the National Renewable Energy Laboratory, Sandia National Laboratories, Army Research Laboratory, and the Jet Propulsion Laboratory. 1-194, FY 2012.

Gregory Krumdick et al. Argonne's Advanced Battery Materials Synthesis and Manufacturing R&D Prooram. Argonne National Laboratory, 1-5. U.S. Department of Energy.

Harshad Tataria et al. Advanced Battery Development, Systems Analysis, and Testing. Advanced Battery Development; Advanced Materials and Processing (FY 2008 FOA); Systems Analysis; Battery Testing Activities; Computer Aided Engineering of Batteries; Small Business Innovative Research Projects (SBIR), and International Collaborative Activities, 1-214.

M. Stanley Whittingham et al. Lithium Batteries and Cathode Materials. Chem. Rev. Sep. 14, 2004 4271-4301. vol. 104. American Chemical Society.

Marca M. Doeff et al. Olivines and Substituted Layered Materials. ES 052. May 10, 2011. Lawrence Berkeley National Laboratory. http:/batt.lbl.gov/battfiles/BattReview2011/es052_doeff_2011_o.pdf.

Kiaofeng Zhang et al. Flame synthesis of 5 V spinel-$LiNi0.5Mn1.5O4$ cathode-materials for litilium-ion rechargeable-batteries. Proceedings of the Combustion Institute. 2011. 1867-1874. vol. 33. Elsevier.

Yasuhiro Fuji et al. Structural and electrochemical properties of $LiNi1/3Co1/3Mn1/3O2$ Calcination temperature dependence Journal of Power Sources. Jun. 17, 2007. 894-903. vol. 171, Elsevier B.V.

PCT/US 20/39665_Notification of transmittal of the international search report and the written opinion of the International searching authority, or the declaration, Aug. 11, 2020.

PCT/US 20/39680_Notification of transmittal of the international search report and the written opinion of the International searching authority, or the declaration, Sep. 30, 2020.

PCT/US 20/40038_Notification of transmittal of the international search report and the written opinion of the International searching authority, or the declaration, Oct. 2, 2020.

\* cited by examiner

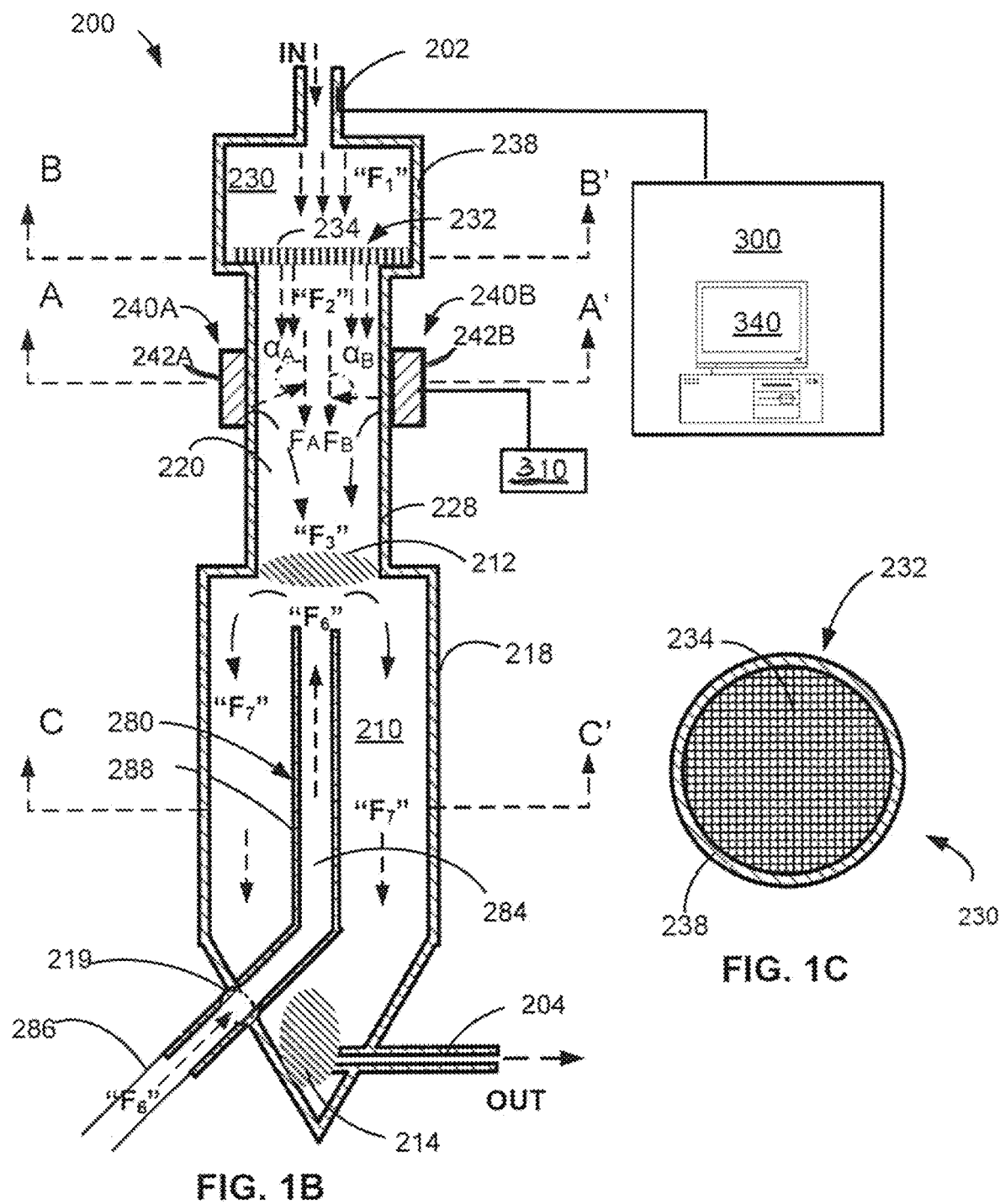

SYSTEM AND PROCESS WITH ASSISTED GAS FLOW INSIDE A REACTION CHAMBER

CROSS-REFERENCE TO RELATED APPLICATIONS

This application is a continuation of U.S. patent application Ser. No. 16/914,458 filed on Jun. 28, 2020, which claims benefit of U.S. provisional patent application Ser. No. 62/868,843, filed on Jun. 28, 2019. All of the above-referenced applications are herein incorporated by reference.

FIELD OF THE INVENTION

This invention generally relates to the preparation of materials for battery applications. More specifically, the invention related to processing system and method of manufacturing structured cathode or anode active materials for use in secondary batteries.

BACKGROUND OF THE INVENTION

Great efforts have been devoted to the development of advanced electrochemical battery cells to meet the growing demand of various consumer electronics, electrical vehicles and grid energy storage applications in terms of high energy density, high power performance, high capacity, long cycle life, low cost and excellent safety. In most cases, it is desirable for a battery to be miniaturized, light-weighted and rechargeable (thus reusable) to save space and material resources.

In an electrochemically active battery cell, a cathode and an anode are immersed in an electrolyte and electronically separated by a separator. The separator is typically made of porous polymer membrane materials such that metal ions released from the electrodes into the electrolyte can diffuse through the pores of the separator and migrate between the cathode and the anode during battery charge and discharge. The type of a battery cell is usually named from the metal ions that are transported between its cathode and anode electrodes. Various rechargeable secondary batteries, such as nickel cadmium battery, nickel-metal hydride battery, lead acid battery, lithium ion battery, and lithium ion polymer battery, etc., have been developed commercially over the years. To be used commercially, a rechargeable secondary battery is required to be of high energy density, high power density and safe. However, there is a trade-off between energy density and power density.

Lithium ion battery is a secondary battery which was developed in the early 1990s. As compared to other secondary batteries, it has the advantages of high energy density, long cycle life, no memory effect, low self-discharge rate and environmentally benign. Lithium ion battery rapidly gained acceptance and dominated the commercial secondary battery market. However, the cost for commercially manufacturing various lithium battery materials is considerably higher than other types of secondary batteries.

In a lithium ion battery, the electrolyte mainly consists of lithium salts (e.g., LiPF6, LiBF4 or LiClO4) in an organic solvent (e.g., ethylene carbonate, dimethyl carbonate, and diethyl carbonate) such that lithium ions can move freely therein. In general, aluminum foil (e.g., 15~20 μm in thickness) and copper foil (e.g., 8~15 μm in thickness) are used as the current collectors of the cathode electrode and the anode electrode, respectively. For the anode, micron-sized graphite (having a reversible capacity around 330 mAh/g) is often used as the active material coated on the anode current collector. Graphite materials are often prepared from solid-state processes, such as grinding and pyrolysis at extreme high temperature without oxygen (e.g., graphitization at around 3000° C.). As for the active cathode materials, various solid materials of different crystal structures and capacities have been developed over the years. Examples of good cathode active materials include nanometer- or micron-sized lithium transition metal oxide materials and lithium ion phosphate, etc.

Cathode active materials are the most expensive component in a lithium ion battery and, to a relatively large extent, determines the energy density, cycle life, manufacturing cost and safety of a lithium battery cell. When lithium battery was first commercialized, lithium cobalt oxide ($LiCoO_2$) material is used as the cathode material and it still holds a significant market share in the cathode active material market. However, cobalt is toxic and expensive. Other lithium transition metal oxide materials, such as layered structured $LiMeO_2$ (where the metal Me=Ni, Mn, Co, etc.; e.g., $LiNi_{0.33}Mn_{0.33}Co_{0.33}O_2$, with their reversible/practical capacity at around 140~150 mAh/g), spinel structured $LiMn_2O_4$ (with reversible/practical capacity at around 110~120 mAh/g), and olivine-type lithium metal phosphates (e.g., $LiFePO_4$, with reversible/practical capacity at around 140~150 mAh/g) have recently been developed as active cathode materials. When used as cathode materials, the spinel structured $LiMn_2O_4$ materials exhibit poor battery cycle life and the olivine-type $LiFePO_4$ materials suffer from low energy density and poor low temperature performance. As for $LiMeO_2$ materials, even though their electrochemical performance is better, prior manufacturing processes for $LiMeO_2$ can obtain mostly agglomerates, such that the electrode density for most $LiMeO_2$ materials is lower as compared to $LiCoO_2$. In any case, prior processes for manufacturing materials for battery applications, especially cathode active materials, are too costly as most processes consumes too much time and energy, and still the qualities of prior materials are inconsistent and manufacturing yields are low.

Conventional material manufacturing processes such as solid-state reaction (e.g., mixing solid precursors and then calcination) and wet-chemistry processes (e.g., treating precursors in solution through co-precipitation, sol-gel, or hydrothermal reaction, etc., and then mixing and calcination) have notable challenges in generating nano- and micron-structured materials. It is difficult to consistently produce uniform solid materials (i.e., particles and powders) at desired particle sizes, morphology, crystal structures, particle shape, and even stoichiometry. Most conventional solid-state reactions require long calcination time (e.g., 4-20 hours) and additional annealing process for complete reaction, homogeneity, and grain growth. For example, spinel structured $LiMn_2O_4$ and olivine-type $LiFePO_4$ materials manufactured by solid-state reactions require at least several hours of calcination, plus a separate post-heating annealing process (e.g., for 24 hours), and still showing poor quality consistency. One intrinsic problem with solid-state reaction is the presence of temperature and chemical (such as $O_2$) gradients inside a calcination furnace, which limits the performance, consistency and overall quality of the final products.

On the other hand, wet chemistry processes performed at low temperature usually involve faster chemical reactions, but a separate high temperature calcination process and even additional annealing process are still required afterward. In addition, chemical additives, gelation agents, and surfactants required in a wet chemistry process will add to the material manufacturing cost (in buying additional chemicals and adjusting specific process sequence, rate, pH, and temperature) and may interfere with the final composition of the as-produced active materials (thus often requiring additional steps in removing unwanted chemicals or filtering products). Moreover, the sizes of the primary particles of the product powders produced by wet chemistry are very small, and tends to agglomerates into undesirable large sized secondary particles, thus affecting energy packing density. Also, the morphologies of the as-produced powder particles often exhibit undesirable amorphous aggregates, porous agglomerates, wires, rods, flakes, etc. Uniform particle sizes and shapes allowing for high packing density are desirable.

The synthesis of lithium cobalt oxide ($LiCoO_2$) materials is relatively simple and includes mixing a lithium salt (e.g., lithium hydroxide (LiOH) or lithium carbonate ($Li_2CO_3$)) with cobalt oxide ($Co_3O_4$) of desired particle size and then calcination in a furnace at a very high temperature for a long time (e.g., 20 hours at 900° C.) to make sure that lithium metal is diffused into the crystal structure of cobalt oxide to form proper final product of layered crystal structured $LiCoO_2$ powders. This approach does not work for $LiMeO_2$ since transition metals like Ni, Mn, and Co does not diffuse well into each other to form uniformly mixed transition metal layers if directly mixing and reacting (solid-state calcination) their transition metal oxides or salts. Therefore, conventional $LiMeO_2$ manufacturing processes requires buying or preparing transitional metal hydroxide precursor compounds (e.g., $Me(OH)_2$, Me=Ni, Mn, Co, etc.) from a co-precipitation wet chemistry process prior to making final active cathode materials (e.g., lithium NiMnCo transitional metal oxide ($LiMeO_2$)).

Since the water solubility of these $Ni(OH)_2$, $Co(OH)_2$, and $Mn(OH)_2$ precursor compounds are different and they normally precipitate at different concentrations, the pH of a mixed solution of these precursor compounds has to be controlled and ammonia ($NH_3$) or other additives has to be added slowly and in small aliquots to make sure nickel (Ni), manganese (Mn), and cobalt (Co) can co-precipitate together to form micron-sized nickel-manganese-cobalt hydroxide ($NMC(OH)_2$) secondary particles. Such co-precipitated $NMC(OH)_2$ secondary particles are often agglomerates of nanometer-sized primary particles. Therefore, the final lithium NMC transitional metal oxide ($LiMeO_2$) made from $NMC(OH)_2$ precursor compounds are also agglomerates. These agglomerates are prone to break under high pressure during electrode calendaring step and being coated onto a current collector foil. Thus, when these lithium NMC transitional metal oxide materials are used as cathode active materials, relatively low pressure has to be used in calendaring step, and further limiting the electrode density of a manufactured cathode.

In conventional manufacturing process for $LiMeO_2$ active cathode materials, precursor compounds such as lithium hydroxide (LiOH) and transitional metal hydroxide (Me($OH)_2$ are mixed uniformly in solid-states and stored in thick $Al_2O_3$ crucibles. Then, the crucibles are placed in a heated furnace with 5-10° C./min temperature ramp up speed until reaching 900° to 950° C. and calcinated for 10 to 20 hours. Since the precursor compounds are heated under high temperature for a long time, the neighboring particles are sintered together, and therefore, a pulverization step is often required after calcination. Thus, particles of unwanted sizes have to be screened out after pulverization, further lowering down the overall yield. The high temperature and long reaction time also lead to vaporization of lithium metals, and typically requiring as great as 10% extra amount of lithium precursor compound being added during calcination to make sure the final product has the correct lithium/transition metal ratio. Overall, the process time for such a multi-step batch manufacturing process will take up to a week so it is very labor intensive and energy consuming. Batch process also increases the chance of introducing impurity with poor run-to-run quality consistency and low overall yield.

Thus, there is a need for an improved process and system to manufacture high quality, structured active materials for a battery cell.

SUMMARY OF THE INVENTION

This invention generally relates to a processing system with assisted gas flow inside a reaction chamber of the processing system and method of producing a particulate material from a liquid mixture upon thereon. More specifically, the invention related to method and processing system for producing material particles (e.g., active electrode materials, etc) in desirable crystal structures, sizes and morphologies.

In one embodiment, a processing system of producing a particulate material from a liquid mixture is provided. The process system includes one or more gas lines, a system inlet connected to the one or more gas lines to deliver one or more gases into the processing system, and one or more power jet modules adapted to jet the liquid mixture into one or more streams of droplets and to jet the one or more streams of droplets into the processing system. The process system further includes a reaction chamber adapted to process a reaction mixture into the product material, and a heating assembly.

In one aspect, the heating assembly includes a second gas line being connected to an opening of a chamber wall of the reaction chamber for delivering one or more second gas flows into the reaction chamber, and a gas delivery element being connected to the second gas line and positioned inside the reaction chamber. In another aspect, the reaction mixture includes the one or more first gas flows, the one or more second gas flows, and the one or more streams of droplets. In another aspect, the processing system further includes a dispersion chamber adapted to be connected to the one or more power jet modules and to disperse the one or more streams of droplets with the flows of one or more gases.

In still another aspect, the processing system further includes a buffer chamber adapted to deliver the one or more gases flowed from the system inlet into the dispersion chamber. In another embodiment, the buffer chamber further includes a gas distributor having one or more channels therein for delivering the one or more gases in gas flows. In another embodiment, the gas distributor is shaped to fit an inner circumference of a chamber wall of the buffer chamber. In yet another aspect, the processing system further includes the one or more gases and the one or more streams of droplets flowed into each other at an angle of between zero degree and about 180 degree inside the dispersion chamber. In one embodiment, the gas delivery element of the processing system is adapted to mix the gas flows with the one or more stream of droplets generated from the one or more power jet modules, and the gas flows and the one or more streams of droplets are flowed into each other at an angle of between zero degree and about 180 degree inside the reaction chamber.

In another embodiment, a processing system is provided to produce a product material and includes one or more first gas lines, a system inlet connected to the one or more first gas lines to deliver one or more first gas flows into the processing system, one or more power jet modules adapted to jet the liquid mixture into one or more streams of droplets and to jet the one or more streams of droplets into the processing system, a dispersion chamber adapted to be connected to the one or more power jet modules and to disperse the one or more streams of droplets with the one or more first gas flows into a gas-liquid mixture, wherein the one or more first gas flows and the one or more streams of droplets are flowed into each other at a dispersion angle (α) of between zero degree and about 180 degree, a reaction chamber adapted to process a reaction mixture into the product material, and a heating assembly. In one aspect, the one or more second gas flows are delivered by the gas delivery element to mix with one or more flows of the gas-liquid mixture at each other at a angle (β) of between zero degree and about 180 degree inside the reaction chamber.

In another embodiment, a method of producing a product material from a liquid mixture is provided. The method includes delivering one or more first gas flows via a system inlet into a buffer chamber of a processing system, delivering one or more second gas flows via a heating assembly into a reaction chamber of the processing system, jetting the liquid mixture into one or more streams of droplets by one or more power jet modules of the processing system, flowing the one or more streams of droplets inside a dispersion chamber of the processing system via the one or more power jet modules, and forming a reaction mixture comprising the one or more first gas flows, the one or more second gas flows, and the one or more streams of droplets inside the reaction chamber. The method may also include heating the reaction chamber of the processing system using the one or more second gas flows which are heated to a temperature of between 100° C. and 1400° C.; and processing the reaction mixture into the product material inside the reaction chamber.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1B is a cross-sectional view of another embodiment of another example of a processing system with assisted gas flow inside a reaction chamber.

FIG. 1C is a cross-sectional view of an apparatus that can be used in a processing system with assisted gas flow inside a reaction chamber.

DETAILED DESCRIPTION

Figure 1A:
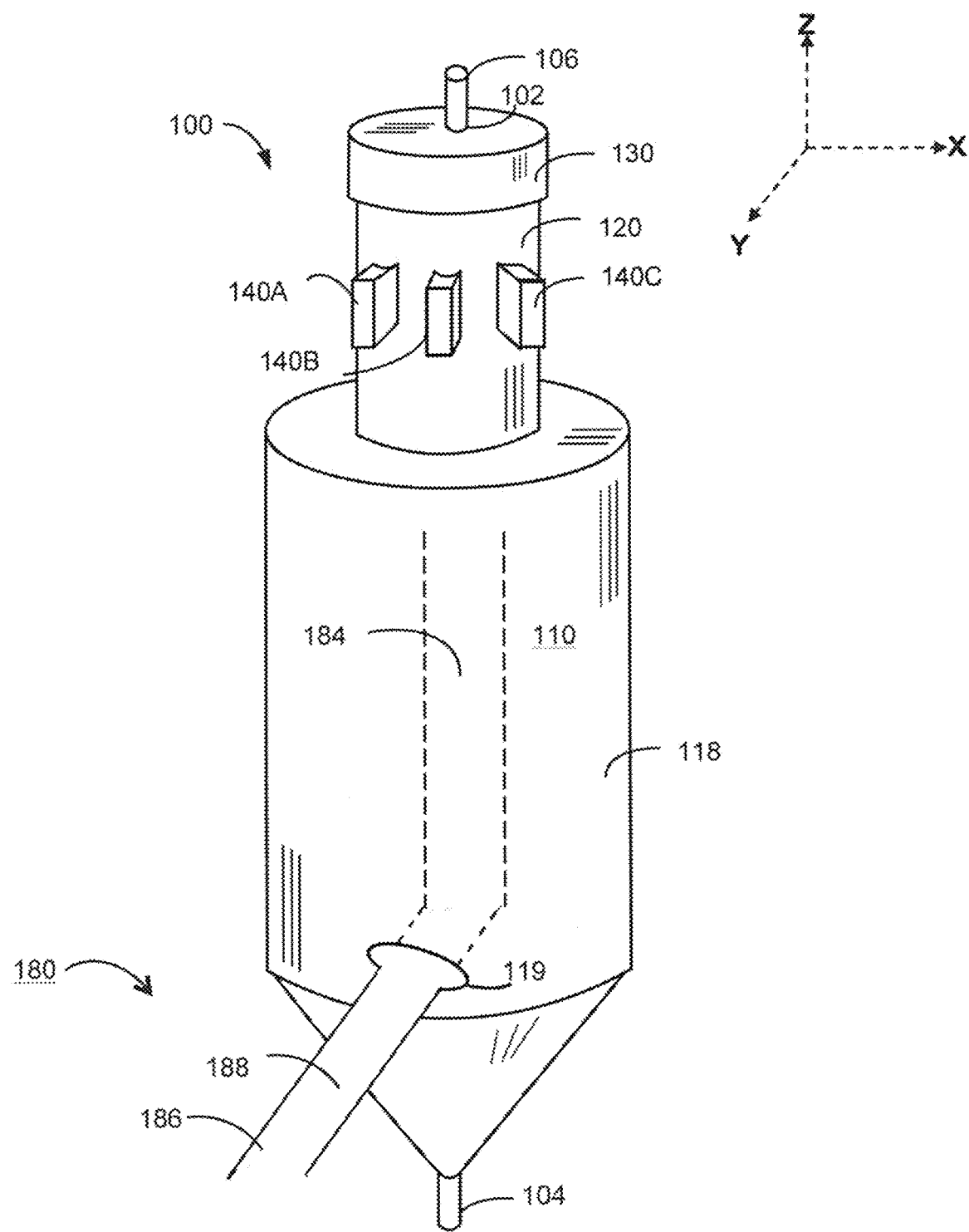
FIG. 1A is a perspective view of one embodiment of one example of a processing system with assisted gas flow inside a reaction chamber.

The present invention generally provides a processing system with assisted gas flow inside a reaction chamber of the processing system and method of producing a particulate material from a liquid mixture upon thereon. The process system is useful, in performing a continuous process to produce a particulate material, save material manufacturing time and energy, and solve the problems of high manufacturing cost, low yield, poor quality consistency, low electrode density, low energy density as seen in conventional active material manufacturing processes. The processing system generally includes a system inlet for delivering one or more gases through one or more gas lines, a buffer chamber, a dispersion chamber coupled to one or more power jet modules, a reaction chamber, a heating assembly inside the reaction chamber, and a system outlet for delivering particulate material out of the processing system.

In one aspect, precursor compounds, such as metal-containing precursors are mixed into a liquid mixture such that the ratio of different metal precursors can be adjustable in desirable ratio and still able to obtain uniform blending of the precursors. The liquid mixture is then promptly mix with a gas to form a gas-solid mixture to be evenly mixed and be continuously processed in gas phase with heated gases, thereby being reacted into dried solid particles of particulate materials inside the reaction chamber.

In another aspect, uniform mixtures of metal precursor compounds in desired ratio are mixed into liquid mixture and jetted into a dispersion chamber to receive one or more gases (e.g., carrier gases, reaction gases, oxidation gases, oxygen gas, etc.) from a buffer chamber, thereby forming droplets of a gas-liquid mixture within the dispersion chamber prior to entering into a reaction chamber.

In one embodiment, the droplets of the gas-liquid mixture are flowed into a reaction chamber to be processed into gas-solid mixtures, where heated air or heated gas is actively flowed into the interior chamber space inside the reaction chamber via a heating assembly such that the heated gas can be served as both the gas source and/or the energy source for various reactions, such as drying reaction, oxidation reaction, heating reaction, etc., inside the reaction chamber.

Reaction products (e.g., particles, battery oxide materials, particulate material, etc.) from the reaction chamber are delivered out of the reaction and cooled down. After cooling, the reaction products contain solid material particles or fine powers of an oxidized form of the precursor composition (e.g., a metal oxide material, such as fine powers of a mixed metal oxide material), with desired crystal structure, particle size, and morphology. Accordingly, high quality and consistent active battery materials can be obtained with much less time, labor, and supervision than materials prepared from conventional manufacturing processes.

In one aspect, the heating assembly includes a gas line being connected to an opening of a chamber wall of the reaction chamber for delivering one or more heated gases (e.g., heated to a temperature of between 100° C. and 1400° C.) into the reaction chamber. The one or more heated gases can serve as energy source for reactants (e.g., reaction mixtures, a gas-liquid mixture, liquid mixtures, and other mixtures, etc.) to react in the reaction chamber, when such gas flow is heated before entering into processing system. The heating assembly further includes a gas delivery element being connected to the gas line and positioned inside the reaction chamber for delivering the one or more heated gases to reach an entry region of the reaction chamber where the entry region is connected to the dispersion chamber. Further, the reaction chamber connects to the system outlet for delivering the particulate material out of the processing system.

In another aspect, a flow of one or more gases (e.g., carrier gas, oxygen gas, inert gas, nitrogen gas, etc., at a temperature of between 200° C. and 400° C.) is delivered into the processing system from a system inlet and served as a gas source for forming a gas-liquid mixture with the liquid mixture, and as a carrying gas for delivering the gas-liquid mixture to the reaction chamber. The gas can also serve as energy source for the gas-liquid mixture to react in the reaction chamber, if such gas is heated to a temperature of 20° C. or higher (e.g., between 100° C. and 400° C.) before entering into processing system.

In still another aspect, a liquid mixture, which can be a metal-containing liquid mixture, is promptly jetted into streams of droplets by one or more power jet modules connected to a dispersion chamber and then dispersed into the dispersion chamber of the processing system. The streams of droplets are continuously mixed with a gas to form a gas-liquid mixture to be flowed and delivered into a reaction chamber.

In one embodiment, inside the reaction chamber the flow of one or more heated gases is actively delivered therein and the gas-liquid mixture are mixed together inside the interior chamber space of the reaction chamber to form a reaction mixture. In another embodiment, the one or more flows of heated gases delivered into the reaction chamber are heated to a desired reaction temperature, such as a temperature between 100° C. to 1400° C., for example, between 300° C. to 1000° C., or between 400° C. to 800° C., etc. In still another embodiment, the reaction chamber of the processing system can be heated to the reaction temperature by using the one or more gases which are heated to a temperature of between 100° C. and 1400° C. Reaction mixtures within the reaction chamber are processed into product materials for a period of reaction time at the reaction temperature inside the reaction chamber and are delivered out of the reaction chamber. As an example, the reaction mixtures may include mixtures of one or more liquids, one or more gases, one or more streams of droplets and heated gases, and combinations thereof.

Processing System with Assisted Gas Flow Inside a Reaction Chamber of the Processing System FIG. 1A is a perspective view of one exemplary embodiment of a processing system 100 provided in a method of producing a particulate material from a liquid mixture therein. The processing system 100 may generally include a system inlet 102, a system outlet 104, a reaction chamber 110, and a heating assembly 180. The heating assembly 180 as being described in detail below is designed to provide assisted gas flows inside the reaction chamber 110 of the processing system 100.

The system inlet 102 is provided for delivering one or more gases, such as carrier gases and other gases, through a gas line 106 into the processing system 100. The system outlet 104 is connected to the reaction chamber 110 for delivering particulate materials out of the processing system 100 after reactants, such as a liquid mixture of chemical solutions (e.g., a mixture of liquid battery reactant chemical solutions, etc.), are processed into products (e.g., battery particulate materials, battery cathode materials, battery anode materials, etc.).

As illustrated by FIG. 1A, the processing system 100 may further include at least one buffer chamber 130 being connected to the system inlet 102 and adapted with one or more gas distributors or gas distributing mechanism (e.g., one or more channels) channels therein for diverting one or more gas flows (e.g., one or more gases $F_1$ as shown in FIG. 1B) received from the system inlet 102 into multiple uniform gas flows (e.g., one or more gas flows $F_2$ as shown in FIG. 1B) flowing inside the processing system 100. The one or more gases flowing inside the buffer chamber 130 may be selected from gas source of air, oxygen, carbon dioxide, nitrogen gas, hydrogen gas, inert gas, noble gas, and combinations thereof, among others.

Further, the processing system 100 may also include a dispersion chamber 120 being coupled to one or more power jet modules (e.g., power jet modules 140A, 140B, 140C, etc.). The one or more power jet modules are provided to receive one or more chemical reactants, to mix chemical reactants into one or more liquid mixtures, and to jet the one or more liquid mixtures into the dispersion chamber 120, thereby delivering the one or more liquid mixtures into the dispersion chamber 120 of the processing system 100.

The power jet modules 140A, 140B, 140C, etc. can be attached to a portion of the dispersion chamber to and employ air pressure to jet the liquid mixture and convert it into a mist containing small sized droplets directly inside the dispersion chamber. Alternatively, a mist can be generated outside the dispersion chamber 120 and delivered into the dispersion chamber 120. Suitable droplet sizes can be adjusted according to the choices of the power jet modules used, the liquid mixture compounds, the temperature of the dispersion chamber 120, the flow rate of the gas, and the residence time inside the dispersion chamber. As an example, a mist with liquid droplet sizes between one tenth of a micron and one millimeter is generated inside the dispersion chamber.

The number of the power jet modules that can be coupled to the dispersion chamber 120 is not limiting, and there can be one, two, three or any number of power jet modules being coupled to the dispersion chamber 120 according to custom design or need-based. In one aspect, two or more power jet modules are positioned around the outer circumference of the dispersion chamber 120. Each power jet module is adapted to jet a liquid-mixture into one or more streams of droplets into the dispersion chamber 120 so that the one or more streams of droplets are mixed with the one or more gases passing through the one or more channels of the gas distributing mechanism of the buffer chamber 130, thereby forming into one or more gas-liquid mixtures within the dispersion chamber 120 to be delivered into the reaction chamber 110.

In one embodiment, the power jet module 140A is coupled to a portion of the dispersion chamber 120 to generate a mist (e.g., a large collection of small size droplets) of the liquid mixture directly within the dispersion chamber. In general, the power jet module 140A is able to generate a mist of mono-sized droplets. In another embodiment, the dispersion chamber 120 is connected to the one or more power jet modules 140A, 140B and 140C, for receiving multiple uniform gas flows from the buffer chamber 130 and dispersing the multiple uniform gas flows with one or more streams of droplets jetted from the array of one or more power jet modules 140A, 140B and 140C into each other.

Further, in one embodiment, the liquid mixture is prepared from two or more precursor compounds and then converted into droplets, each droplet will have the two or more precursors uniformly distributed together. Then, the moisture of the liquid mixture is removed by passing the droplets through the dispersion chamber and the flow of the gas is used to carry the mist within the dispersion chamber for a suitable residence time. It is further contemplated that the concentrations of the precursor compounds in a liquid mixture and the droplet sizes of the mist of the liquid mixture can be adjusted to control the chemical composition, particle sizes, and size distribution of final product particles of the battery material.

In one embodiment, the reaction chamber 110 of the processing system 100 is provided to receive the one or more streams of the droplets of the gas-liquid mixtures and process the one or more gas-liquid mixtures delivered from the dispersion chamber 120 by reacting the gas-liquid mixtures with one or more heated gases to oxidize and heat the gas-liquid mixtures into final reaction products, e.g., battery particulate materials, oxidized metal oxide materials, etc.

In another embodiment, the reaction chamber 110 is connected to the heating assembly 180 with assisted gas flow therein for delivering heated gases from a gas line 186 connected to the heating assembly 180 with a portion of the heating assembly 180 being positioned into the interior chamber space of the reaction chamber 110. The heating assembly 180 is connected to the reaction chamber 110 via an opening 119 located on a chamber wall 118 of the reaction chamber 110.

The heating assembly 180 includes a gas delivery element 184 within the interior chamber space of the reaction chamber 110. In one embodiment, the gas delivery element 184 is designed to provide dry heat source and/or gas source to the reactants within the reaction chamber 110. It is contemplated that an opening of the gas delivery element 184 is positioned to be near the connection between the dispersion chamber 120 and the reaction chamber 110 in order to process the gas-liquid mixtures received from the dispersion chamber 120 inside the reaction chamber 110

A wall 188 of the gas delivery element 184 of the heating assembly 180 is provided to channel the gas flow of the heated gases received from the gas line 186 to be flowed through the gas delivery element 184 to reach an entry region between the reaction chamber 110 and the dispersion chamber 120 so that the heated gases delivered from the gas delivery element 184 of the heating assembly 180 is then flowed out of the gas delivery element 184 of the heating assembly 180 to fill the interior chamber space within the chamber wall 118 of the reaction chamber 110.

In one embodiment, the gas delivery element 184 is preferably positioned upwardly inside the reaction chamber 110. In another embodiment, the gas delivery element 184 can be positioned at any angle to the ground, ranging from 0 degree to 90 degree. In one aspect, the gas delivery element 184 is vertical to the ground. In another aspect, the gas delivery element 184 can be at any angle to the ground, ranging from 0 degree to 90 degree.

FIG. 1B is a cross-sectional view of an exemplary processing system 200 that can be used to carry out a fast, simple, continuous and low-cost manufacturing process for producing a battery particulate material. The processing system 200 includes a system inlet 202 for delivering one or more gases into the processing system 200, a buffer chamber 230 connected to the system inlet 202, a dispersion chamber 220 connected to the buffer chamber 230, a heating assembly 280, and a reaction chamber 210 connected to the dispersion chamber 220, and a system outlet 204 connected to the reaction chamber 210 for delivering the resulting particulate material out of the processing system 200.

The system inlet 202 is provided to deliver one or more gases $F_1$ into the buffer chamber 230. The one or more gases $F_1$ are pressured downward to flow at a certain gas speed through a gas distributor 232 of the buffer chamber 230 so as to direct and distribute the one or more gases $F_1$ into multiple uniform gas flows $F_2$ out of the buffer chamber 230 and into the dispersion chamber 220. The gas distributor 232 can have one or more channels 234 arrange in a circular phase to direct gas flows, for example, channels 234 of the gas distributor 232 can be arranged in a shower head like manner so that the flow of the gas $F_1$ can be distributed into multiple uniform gas flows $F_2$. In one embodiment, the one or more gases $F_1$ may be pumped through an air filter to remove any particles, droplets, or contaminants, and the flow rate of the gas $F_1$ can be adjusted by a valve or other means. In one embodiment, the flow rate of multiple uniform gas flows $F_2$ coming out of the channels 234 will be higher than the flow rate of one or more gases $F_1$. Additionally, the direction of multiple uniform gas flows $F_2$ will be gathered and unified.

FIG. 1C is an example of a cross-sectional view (sectioned by a dashed line B-B' in FIG. 1B) of the buffer chamber 230 according to one embodiment of the invention. The gas distributor 232 of the buffer chamber 230 is positioned at the bottom portion of the buffer chamber 230 and include multiple channels 234 within the inner side of chamber wall 238 of the buffer chamber 230 and provided to direct the gases $F_1$ received from the system inlet 202 into multiple unified gas flows $F_2$. The channels 234 of the gas distributor 232 allow one or more gases to passing in a unified direction and at a desired uniform flow rate.

The one or more gases $F_1$ may be one or more carrier gases, for example, air, oxygen, carbon dioxide, nitrogen gas, hydrogen gas, inert gas, noble gas, and combinations thereof, among others. The choice of the one or more gases may be one or more gases that mix well with the streams of droplets of the battery metal precursors without reacting to the streams of droplets. In some cases, the chemicals in the streams of droplets may react to the gases $F_1$ and/or $F_2$ to certain extent during mixing and/or other reactions inside the dispersion chamber, depending on the temperature of the gas $F_1$ and/or $F_2$ and the chemical composition of the streams of droplets. In addition, the residence time of the gas-liquid mixture of thoroughly mixed streams of droplets compounds within the dispersion chamber 220 is adjustable and may be, for example, between one second and one hour, depending on the flow rate of the one or more gas $F_1$ and $F_2$, and the length of the path that the streams of droplets has to flow through within the dispersion chamber 220.

Figure 2A:
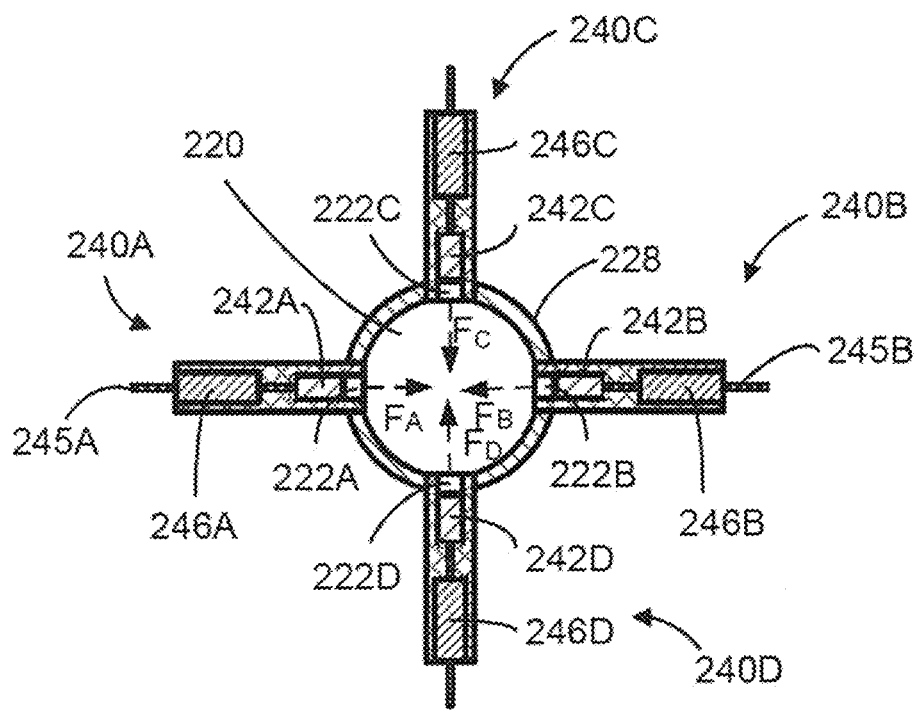
FIG. 2A is a cross-sectional view of a dispersion chamber of said apparatus can be used in a processing system with assisted gas flow inside a reaction chamber.

In one embodiment, the dispersion chamber 220 of the processing system 200 is connected to one or more power jet modules (such as power jet modules 240A, 240B, etc.) which are attached to the outer circumference of a chamber wall 228 of the dispersion chamber 220. FIG. 2A is a cross-sectional view of the dispersion chamber 220 configured in the processing system 200 (as sectioned by a dashed line A-A' as shown in FIG. 16) according to one embodiment of the invention. In one embodiment, an array of one or more power jet modules (e.g., 4 of power jet module 240A, 240B, 240C, 240D as shown in FIG. 2A, or more number of power jet modules, not shown) can be attached to the chamber wall 228 of the dispersion chamber 220 in symmetrical (also shown in FIG. 2A) or in other manner (e.g., power jet modules can be arranged in stacking, intercalating, etc. or other manner)

In FIG. 2A, one or more opening 222A, 222B, 222C and 222D on the chamber wall 228 of the dispersion chamber 220 are connected to the power jet module 240A, 240B, 240C, 240D, respectively. In one example, power jet modules 240A, 240B, 240C, 240D can be attached to the chamber wall 228 of the dispersion chamber 220 in one arrangement shown in FIG. 2A. The arrangement can be each of four power jet being configured to the chamber wall 228 in an evenly distance adjacent to each other on a same horizontal line of the chamber wall 228.

Each of the power jet modules 240A, 240B, 240C, 240D includes a power jet 242A, 242B, 242C, 242D, respectively, for jetting a liquid mixture supplied to the power jet module. 240A into one or more streams of droplets. Each of the power jet module 240A, 240B, 240C, 240D may further include a support frame for supporting the power jet module 240A, 240B, 240C, 240D, a module actuator 246A, 246B, 246C, 246D, and a connector 245A, 245B, 245C, 245D, respectively. Each of the module actuator 246A, 246B, 246C, 246D is attached to the inner side of its own support frame for actuating and forcing the one or more streams of droplets $F_A$, $F_B$, $F_C$, $F_D$, respectively, jetted from each of the power jets 242A, 242B, 242C, 242D into the dispersion chamber 220. Each of the connectors 245A, 245B, 245C, 245D is provided to connect the module actuators 246A, 246B, 246C, 246D and the power jets 242A, 242B, 242C, 242D, respectively.

In one example, the power jets 242A, 242B, 242C, 242D are positioned near the side of the dispersion chamber 220 to horizontally inject the streams of droplets $F_{A-D}$ into the dispersion chamber 220 and pass through the dispersion chamber horizontally and sidewardly as shown in FIG. 1B. For example, when the dispersion chamber 220 is positioned horizontally (e.g., a tube dispersion chamber, etc.) and the power jets 242A, 242B, 242C, 242D are positioned near one end of the dispersion chamber 220, a flow of the mist, being delivered from the one end through another end of the dispersion chamber 220, can pass through a path within the dispersion chamber 220 for the length of its residence time.

In another example, the power jets 242A, 242B, 242C, 242D are positioned near the top of the dispersion chamber 220 to vertically (e.g., a dome-type dispersion chamber, etc.) inject the streams of droplets $F_A$, $F_B$, $F_C$, $F_D$ into the dispersion chamber 220 and pass through the dispersion chamber vertically downward. Alternatively, power jets 242A, 242B, 242C, 242D can be positioned near the bottom of the dispersion chamber 220 to vertically inject the streams of droplets upward (which can be indicated as FIG. 2B) into the dispersion chamber to increase the residence time of the streams generated therein.

As shown in FIG. 1B, aside from streams of liquid mixture, the dispersion chamber 220 is also filled with flows of gases received from the buffer chamber 230. The gas distributor 232 is coupled to the end portion of the buffer chamber 230 and adapted to flow multiple uniform gas flows $F_2$ into the dispersion chamber 220. A flow of multiple uniform gas flows $F_2$ can be delivered, concurrently with the formation of the streams of droplets inside dispersion chamber 220, into the dispersion chamber 220 to carry the streams of droplets through the dispersion chamber 220, may or may not remove moisture from the mist, and form one or more flows of gas-liquid mixtures $F_3$ with a direction containing the liquid mixtures. Also, the flow of multiple uniform gas flows $F_2$ can be delivered into the dispersion chamber 220 prior to the formation of the mist to fill and preheat to a temperature $T_D$ an internal volume of the dispersion chamber 220 prior to generating the streams of droplets inside the dispersion chamber 220.

In one example, the gas distributor 232 is connected to the end portion of the buffer chamber 230 which connects to the top portion of the dispersion chamber 220 to deliver the multiple uniform gas flows $F_2$ into the dispersion chamber 220 to be mixed with the streams of droplets generated by the power jet modules 240A, 240B, 240C, 240D attached to the chamber wall 228 of the dispersion chamber 220. In one embodiment, multiple uniform gas flows $F_2$ is preheated to a temperature of between 20° C. and 400° C. to mix with and remove moisture from the streams of droplets. In another embodiment, the multiple uniform gas flows $F_2$ is not preheated and used to ensure the gas-liquid mixture formed within the dispersion chamber 220 is uniformly mixed with the gas.

In another embodiment, each of the power jets 242A, 242B, 242C, 242D is shaped in various structures, for example, in a cuboid structure having six rectangular faces at right angles to each other, a cylinder structure with straight parallel sides and a circular or oval section, and/or a combination thereof. Further, each of the power jets 242A, 242B, 242C, 242D may consist a nozzle array on one side face of the power jet. In one embodiment, the nozzle array is on the side face of the power jet with a bottom width longer than the side length, and consists of evenly placed orifices forming a rectangular form. In another embodiment, the nozzle array consists of another patterns of orifices. Other examples of power jet modules are described in U.S. application Ser. No. 16/457,885, titled "Processing System and Method for Producing a Particulate Material, filed on Jun. 28, 2019, and also in U.S. application Ser. No. 16/457,889, titled "System with Power Jet Modules and Method thereof", filed on Jun. 28, 2019, and the disclosure of each of these patent applications is hereby incorporated by reference in its entirety.

Figure 2B:
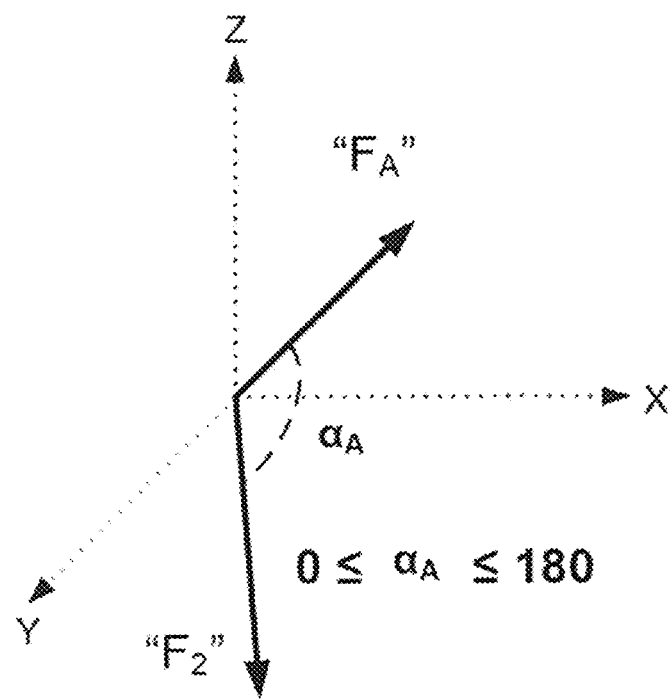
FIG. 2B illustrates an angle between a gas flow and a stream of droplets inside a dispersion chamber according to one embodiment of the invention.
Figure 3A:
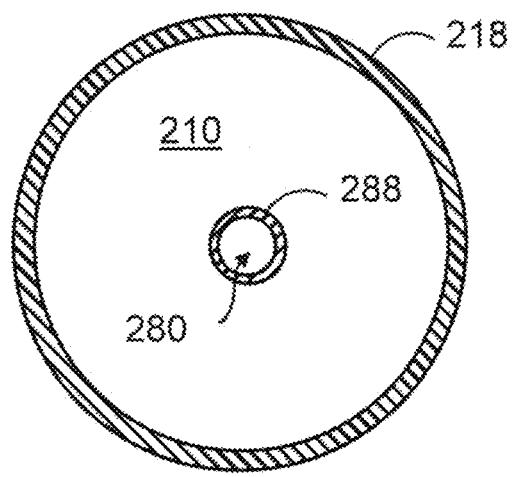
FIG. 3A is a cross-sectional view of a reaction chamber of said apparatus can be used in the processing system with assisted gas flow inside a reaction chamber.
Figure 3B:
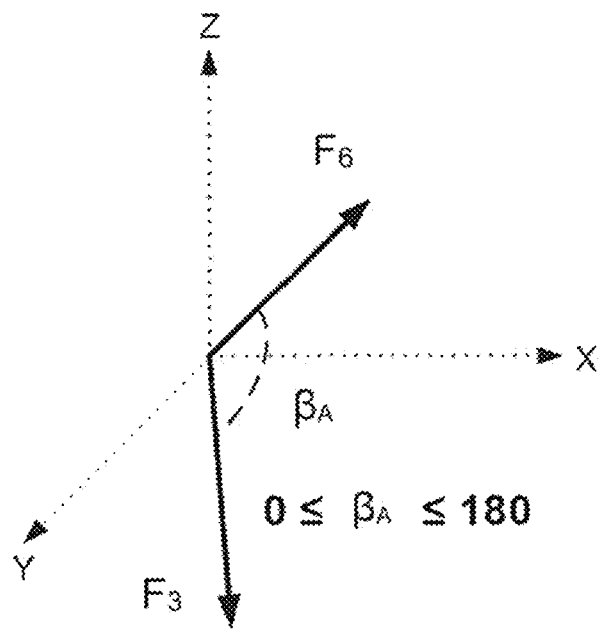
FIG. 3B illustrates an angle between a gas-liquid mixture and a flow of heated gases inside the reaction according to one embodiment of the invention.

FIG. 2B illustrates a 3D perspective view of one example of a dispersion angle ($\alpha_A$) formed by a flow stream $F_A$ of droplets and the gas flow $F_2$ inside the dispersion chamber 220. The dispersion angle $\alpha$ is measured according to the angle between the direction of the flow streams $F_A$, $F_B$, $F_C$, $F_D$ of droplets and the direction of the gas flows $F_2$. In one example, the flows of the streams $F_A$, $F_B$, $F_C$, $F_D$ of droplets of the liquid mixture (e.g., the streams of droplets $F_A$) and the flows of the gas (e.g., the multiple uniform gas flows $F_2$) may encounter with each other inside the dispersion chamber 220 at an angle of 0 degree to 180 degrees. In another example, the air streams of the streams of droplets flow $F_A$ and the gas flow $F_2$ may be flown in straight lines, spiral, intertwined, and/or in other manners.

In one embodiment, the flow stream $F_A$ of droplets and the gas flows $F_2$ are configured at an $\alpha_A$ angle ($0 \le \alpha_A \le 180°$) and can merge into one or more mixed flows (e.g., flows of gas-liquid mixtures $F_3$) inside the dispersion chamber 220 (e.g., co-currents). In addition, the stream $F_A$ of droplets and the gas flows $F_2$ may be flown at various angles directed to each other and/or to the perimeter of the chamber body to promote the formation of spiral, intertwined, and/or other air streams inside the dispersion chamber 220.

For example, the flow of the gases and the flow of the stream of droplets flowing inside the dispersion chamber 220 can be configured to flow as co-currents. Advantages of co-current flows are shorter residence time, lower particle drying temperature, and higher particle separation efficiency, among others. As another example, the droplets streams flow $F_A$ and the gas flows $F_2$ can be configured at an $\alpha$ angle of 180 degrees and are flown as counter currents. Advantages of counter currents are longer residence time and higher particle drying temperature, among others. In an alternative embodiment, the dispersion chamber 220 can be positioned horizontally.

In one example, the streams $F_A$, $F_B$, $F_C$, $F_D$ of droplets and the gas flow are configured at an $\alpha$ angle of less than 90 degrees and can merge into a mixed flow of gas-liquid mixtures $F_3$ inside the dispersion chamber. In another embodiment, the streams flow $F_A$ of droplets and the gas flows $F_2$ are configured at an $\alpha$ angle of 90 degrees and can merge into one or more mixed flows (e.g., flows of gas-liquid mixtures $F_3$) inside the dispersion chamber 220. In addition, the flow streams $F_A$ of droplets and the gas flows $F_2$ may be flown at various angles directed to each other and/or to the perimeter of the chamber body to promote the formation of spiral, intertwined, and/or other air streams inside the dispersion chamber 220.

Referring back to FIG. 1B, once the streams $F_A$, $F_B$, $F_C$, $F_D$ of droplets of the liquid mixture is mixed with gas flows $F_2$ into a gas-liquid mixture, the gas-liquid mixture is delivered through the dispersion chamber 220 into the reaction chamber 210. The reaction chamber 210 of the processing system 200 is connected to the dispersion chamber 220 for receiving one or more flows of gas-liquid mixtures $F_3$ delivered from the dispersion chamber 220. In addition, the reaction chamber 210 is connected to an the heating assembly 280 via an opening 219 on a chamber wall 218 of the reaction chamber 210 for delivering one or more heated gases $F_6$ into an interior chamber space within the reaction chamber 210.

The heating assembly 280 includes a gas delivery element 284 surrounded by a wall 288 to channel flows of one or more heated gases $F_6$ delivered from a gas line 286. The gas delivery element 284 is connected to the gas line 286 on one end and on another end extended into the interior chamber space of the reaction chamber 210 for delivering the one or more heated gases $F_6$ to reach an entry region 212 of the reaction chamber 210 where the entry region 212 is adjacent to the dispersion chamber 220. Further, processed products such as oxide particles, particulate materials, etc., are formed near an exit region 214 and delivered out of the processing system 200 via the system outlet 204, which is positioned near on end of the reaction chamber 210.

In one embodiment, one or more flows of heated gases $F_6$ are delivered through the gas delivery element 284 of the heating assembly 280 to mix with the one or more flows of gas-liquid mixtures $F_3$ which are delivered from the dispersion chamber 220 at an angle with each other inside the reaction chamber 210. The angle of the flows of one or more heated gases $F_6$ and the one or more flows of gas-liquid mixtures $F_3$ can be between zero degree and 180 degree.

In one embodiment, the one or more gases $F_6$ can be heated before being delivered into the reaction chamber through the opening 219 of the chamber wall 218 of the reaction chamber 210. The flows of one or more heated gases Fe can be heated by passing through a suitable heating mechanism, such as electricity powered heater, fuel-burning heater, a burner, among other heaters. Further, the flows of one or more heated gases $F_6$ can be heated at a temperature between 100° C. and 1400° C., such as between 300° C. to 1000° C., or between 400° C. to 800° C., etc. thus providing sufficient energy as a heating source for desired reaction within the reaction chamber. The wall 288 of the heating assembly 280 is made of adiabatic material, e.g. stainless steel, and is able to sustain the high temperature in the space surrounded by the wall 288 at a high temperature where the temperature can be more than 100° C., such as 300° C. or higher, 500° C. or higher, or 1000° C. or higher, e.g., between 400° C. to 800° C., etc.

In another embodiment, the gas-liquid mixtures $F_3$ and the heated gases $F_6$ may collide with each other near the entry region 212 inside the reaction chamber 210 and adjacent to the dispersion chamber 220. In one example, the gas delivery element 284 of the heating assembly 280 can be extended to a location inside the reaction chamber, where one or more flows of gas-liquid mixtures $F_3$ are sufficiently collided with the flows of one or more heated gases $F_6$ to form reaction mixture $F_7$ so as to provide sufficient heat energy for the one or more flows of gas-liquid mixtures $F_3$, thereby continuously commencing desired reactions in fast and sufficient time and manner within the reaction chamber 210. For example, the gas delivery element 284 is preferably positioned closely to the entry region 212 inside the reaction chamber 210 where the entry region 212 is adjacent to the dispersion chamber 220.

In one embodiment, the gas delivery element 284 is preferably positioned upwardly inside the reaction chamber 210 for delivering the one or more heated gases $F_6$ to the entry region 212. In another embodiment, the gas delivery element 284 can be positioned at any angle to the chamber body of the reaction chamber 210, ranging from 0 degree to 90 degree. In one example, the chamber body of the reaction chamber 210 is vertical to the ground. In another example, the chamber body of the reaction chamber 210 can be positioned at any angle to the ground, ranging from 0 degree to 90 degree.

FIG. 3A is a cross-sectional view (as shown by a dashed line C-C' in FIG. 1B) of the reaction chamber 210 having the heating assembly 280 to assist and deliver heated gas flow therein. The shape of the channel enclosed by the wall 288 of the gas delivery element 284 of the heating assembly 280 can be circular (as shown in FIG. 1B) or other shapes (e.g., elliptical, rectangular, square, etc.) The diameter of the gas delivery element 284 of the heating assembly 280 can vary such that a ratio of the diameter of the wall 288 of the gas delivery element 284 versus the diameter of the chamber body (surrounded by the chamber wall 218) of the reaction chamber 210 can be between 1:10 and about 1:1.

FIG. 3B illustrate a 3D perspective view of a dispersion angle of a flow of gas-liquid mixtures $F_3$ and a flow of one or more heated gases $F_6$ inside the reaction chamber 210. Inside the reaction chamber 210, the flow of one or more heated gases $F_6$ are delivered through the gas delivery element 284 to mix with the flow of gas-liquid mixtures $F_3$ at each other at an angle $\beta$ (e.g., $\beta_A$). The angle $\beta$ is measured according to the angle formed by the direction of the heated gas flows $F_6$ and the direction of the flow of gas-liquid mixtures $F_3$. The flow of the gas-liquid mixtures $F_3$ and of the one or more gases mixtures (e.g., the flows of one or more heated gases $F_6$) may collide with each other inside the reaction chamber 210 at an angle of 0 degree to 180 degrees. In addition, the streams of the flow of gas-liquid mixtures $F_3$ and the flow of one or more heated gases $F_6$ may be flown in straight lines, spiral, intertwined, and/or in other manners.

In one embodiment, the flow of one or more heated gases $F_6$ and the flow of gas-liquid mixtures $F_3$ are configured at an $\beta_A$ angle ($0 \le \beta_A \le 180°$) and can merge into a reaction mixture $F_7$ for a duration of a reaction time inside the reaction chamber (e.g., co-currents). In addition, the flow of one or more heated gases $F_6$ and the flow of gas-liquid mixtures $F_3$ may be flown at various angles directed to each other and/or to the perimeter of the chamber body to promote the formation of spiral, intertwined, and/or other air streams inside the reaction chamber 210. In one embodiment, the flow of one or more heated gases $F_6$ and the flow of gas-liquid mixtures $F_3$ are configured at an $\beta_A$ angle of less than 90 degrees and can merge into a mixed flow inside the reaction chamber. In another embodiment, the flow of one or more heated gases $F_6$ and the flow of gas-liquid mixtures $F_3$ are configured at an $\beta$ angle of 90 degrees and can merge into a reaction mixture $F_7$ inside the reaction chamber. In addition, the flow of one or more heated gases $F_6$ and the flow of gas-liquid mixtures $F_3$ may be flown at various angles directed to each other and/or to the perimeter of the chamber body to promote the formation of spiral, intertwined, and/or other air streams inside the reaction chamber 210.

For example, the flow of the gas $F_6$ and the flow of the gas-liquid mixture $F_3$ within the reaction chamber 210 can be flowed as co-currents and merged into one or more flows reaction mixtures $F_7$. In another example, the flow of one or more heated gases $F_6$ and the flow of gas-liquid mixtures $F_3$ flowing inside the reaction chamber 210 can be configured to flow as counter currents (e.g., at a $\beta$ angle of 180 degrees) and merged into one or more flows reaction mixtures $F_7$. In an alternative embodiment, the reaction chamber 210 can be positioned vertically, horizontally, or at an angle.

Referring back to FIG. 1B, the processing system 200 is connected to an electronic control unit 300 with a CPU 340 for automatic control of the processing system 200. For example, each of the power jet modules 240A, 240B, 240C, 240D is connected to a liquid source 310 to store desired amounts of liquid mixture compounds, and also to an electronic control unit 300 for directing and controlling the delivery of liquid mixture compounds from the liquid source 310 to each of the power jets 242A, 242B, 242C, 242D. In one configuration, the liquid mixture within the liquid source 310 can be pumped from the liquid source 310 to each of the power jet 242A, 242B, 242C, 242D by a pump. Pumping of the liquid mixture by the pump can be configured, for example, continuously at a desired delivery rate (e.g., adjusted by a metered valve or other means) to achieve good process throughput of processing system 200.

In one embodiment, the flows of streams (e.g., $F_A$, $F_B$, etc.) of droplets jetted into the dispersion chamber 220 are dispersed with multiple uniform gas flows $F_2$ in a dispersion angle $\alpha$ (e.g., $\alpha_A$, $\alpha_B$, etc.) with each other to form into one or more flows of gas-liquid mixtures $F_3$. The gas flows $F_2$ functions as a carrier gas comprising one or more gases (e.g., air, oxygen gas, nitrogen gas, inert gas, etc.) and carry the flows of streams $F_A$ and $F_B$ of droplets into the dispersion chamber 220 and eventually into the reaction chamber 210 by forming into one or more flows of gas-liquid mixtures $F_3$ containing the multiple uniform gas flows $F_2$ and the streams of droplets $F_A$.

In one embodiment, the gas flows $F_1$ and $F_2$ can be maintained a temperature between 20° C. and 400° C. In one aspect, the temperature of $F_2$ is maintained at between 20° C. and 100° C. In another aspect, the temperature of $F_2$ is maintained at between 20° C. and 200° C. In still another aspect, the temperature of $F_2$ is maintained at between 25° C. and 400° C. In addition, the dispersion chamber 220 can be maintained at a temperature $T_D$ at between 20° C. and 400° C., such as between 30° C. and 100° C., or between 50° C. and 200° C.

The flows of gas-liquid mixtures $F_3$ and the one or more heated gases $F_6$ are mixed together to form a reaction mixture $F_7$ for a duration of a reaction time inside the reaction chamber 210. The reaction mixture $F_7$ may include the gas-liquid mixtures $F_3$ (containing the gas flows $F_1$, $F_2$ and the streams ($F_A$, $F_B$, $F_C$, $F_D$, etc.) of droplets and the one or more flows of heated gases $F_6$. The reaction chamber 210 of the processing system 200 can be maintained at a reaction temperature $T_R$ of between 100° C. and 1400° C. by using the one or more heated gases $F_6$ having a temperature of between 100° C. and 1400° C. In one embodiment, the temperature $T_R$ is higher than the temperature $T_D$.

In another embodiment, the gas flows $F_6$ is heated to a drying temperature or an oxidation temperature to mix with the gas-liquid mixtures $F_3$ and remove moisture from the gas-liquid mixtures $F_3$. It is designed to obtain spherical solid particles from a thoroughly-mixed gas-liquid mixtures $F_3$ of two or more liquid mixtures. In contrast, conventional solid-state manufacturing processes involve mixing or milling a solid mixture of two or more compounds, resulting in uneven mixing of two or more compounds.

The reaction mixture $F_7$ inside the reaction chamber 210 are processed into the product material (e.g., a gas-solid mixture of oxidized reaction mixtures mixed with the flows of one or more heated gases and/or other gas-phase by-products, or waste products, etc.) and accumulated near the exit region 214 to be delivered out of the processing system 200 via the system outlet 204 after a duration of a reaction time inside the reaction chamber 210. The product material delivered out of the reaction chamber 210 contain solid material particles or fine powers of an oxidized form of the liquid mixture composition (e.g., a metal oxide material, such as fine powers of a mixed metal oxide material), with desired crystal structure, particle size, and morphology.

Optionally, in one embodiment, the processing system 200 further includes a separator connected to the system outlet 204 at the end of the reaction chamber 210 and adapted to collecting the flows of processed products and separating the processed products into solid particles and waste products. Examples of suitable separators include cyclones, electrostatic separators, electrostatic precipitators, gravity separators, inertia separators, membrane separators, fluidized beds, classifiers, electric sieves, impactors, particles collectors, leaching separators, elutriators, air classifiers, leaching classifiers, and combinations thereof, among others.

The product material can be cooled to obtain final solid particles of desired size, morphology, and crystal structure, ready to be further used for further analysis on their properties (e.g., specific capacity, power performance, particulate charging cycle performance, etc.), particle sizes, morphology, crystal structure, etc. for battery applications. For example, the product material may be slowly cooled down to room temperature to avoid interfering or destroying a process of forming into its stable energy state with uniform morphology and desired crystal structure. Accordingly, high quality and consistent active particulate materials can be obtained with much less time, labor, and supervision than materials prepared from conventional manufacturing processes.

Method of Producing a Particulate Material from a Liquid Mixture Upon a Processing System with Assisted Gas Flow Inside a Reaction Chamber of the Processing System.

Figure 4:
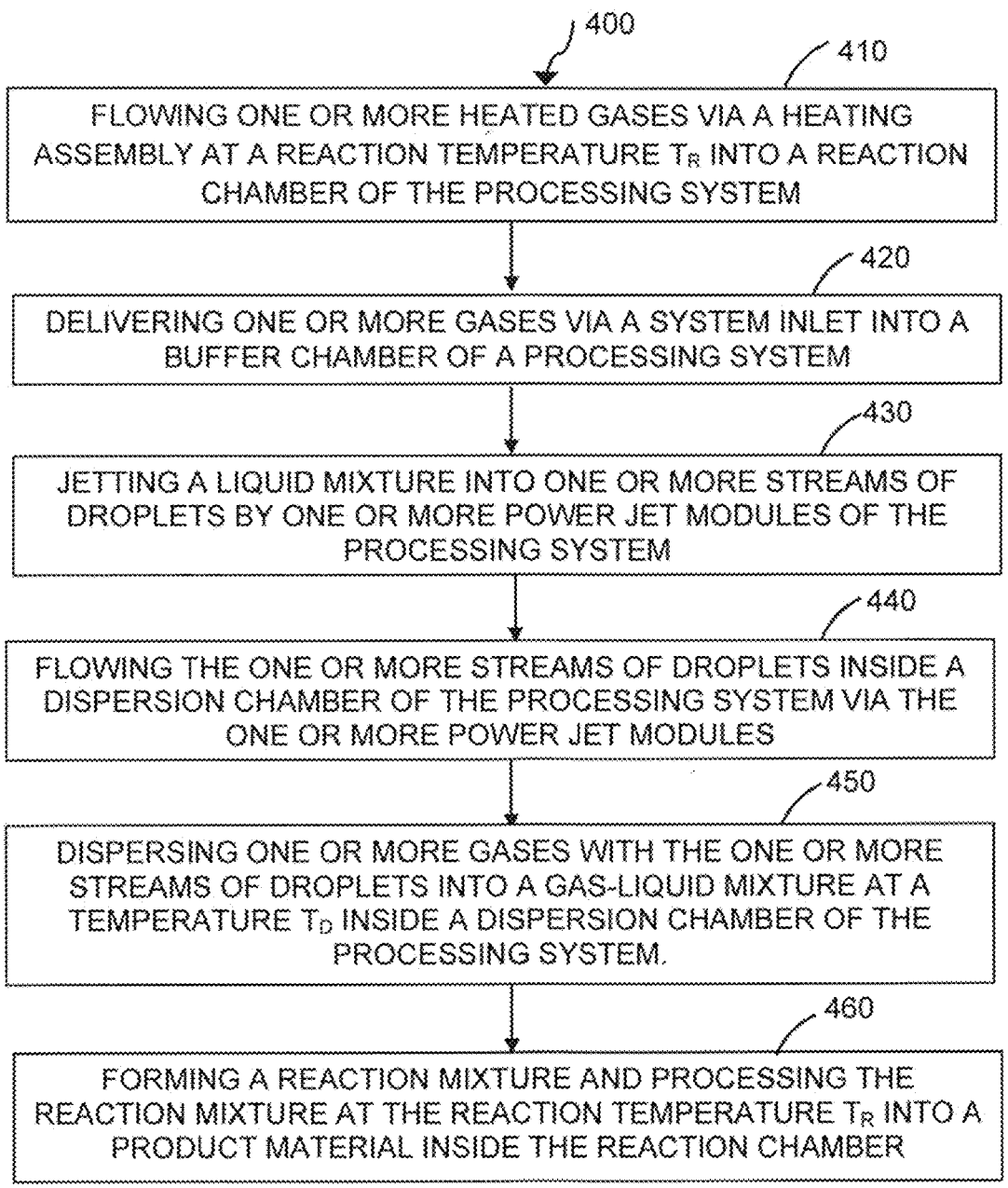
FIG. 4 illustrates a method of producing a particulate material.

FIG. 4 illustrates a method 400 of producing a product material from a liquid mixture. At Step 410, one or more heated gases having a temperature $T_R$ are flowed into a reaction chamber of the processing system via a heating assembly. For example, the heating assembly 280 is provided to be connected to the gas line 286 and to the opening 219 on the chamber wall 218 of the reaction chamber 210 for delivering one or more heated gases into the reaction chamber 210. The heated gases from the gas line 206 is channeled through the wall 288 within the gas delivery element 284 of the heating assembly 280. In one example, the gas delivery element 284 is positioned to reach the entry region 212 of the reaction chamber 210 adjacent to the dispersion chamber. In one embodiment, the gas delivery element 284 is preferably positioned upwardly inside the reaction chamber 210. In another embodiment, the gas delivery element 284 can be positioned at any angle to the ground, ranging from 0 to 90 degree.

The flow of one or more heated gases is heated to a desired reaction temperature, such as a temperature of between 100° C. to 1400° C., and flowed into the reaction chamber to serve as the energy source for drying and/or reacting the gas-liquid mixture into a reaction mixture for a residence time. The advantages of flowing air or gas already heated are faster heat transfer, uniform temperature distribution (especially at high temperature range), and easy to scale up, among others. The residence time may be any residence time to carry out a complete reaction of the one or more flows of gas-liquid mixtures, such as a residence time of between one second and ten hours, or longer.

Exemplary gas flows of one or more heated gases include, but are not limited to, air, oxygen, carbon dioxide, an oxidizing gas, nitrogen gas, inert gas, noble gas, and combinations thereof. For an oxidation reaction inside the reaction chamber 210, such as forming an oxide material from one or more liquid mixtures, an oxidizing gas can be used as the gas flows. For a reduction reaction inside the reaction chamber, a reducing gas can be used as the heated gases. Further, heated gas can be used as the gas source for forming the gas-liquid mixtures.

At Step 420, optionally, one or more gases are delivered via a system inlet into a buffer chamber of a processing system. The one or more gas may be, for example, air, oxygen, carbon dioxide, nitrogen gas, hydrogen gas, inert gas, noble gas, and combinations thereof, among others.

At Step 430, a liquid mixture is jetted into one or more streams of droplets by one or more power jet modules of the processing system. A liquid mixture is formed from two or more precursors. In general, liquid form of a precursor compound can be prepared directly into a liquid mixture in a desired concentration. Solid form of a precursor compound can be dissolved or dispersed in a suitable solvent (e.g., water, alcohol, isopropanol, or any other organic or inorganic solvents, and their combinations) to form into a liquid mixture of an aqueous solution, slurry, gel, aerosol or any other suitable liquid forms. For example, desirable molar ratio of two or more solid precursors can be prepared into a liquid mixture, such as by measuring and preparing appropriate amounts of the two or more solid precursors into a container with suitable amounts of a solvent. Depending on the solubility of the precursors in the solvent, pH, temperature, and mechanical stirring and mixing can be adjusted to obtain a liquid mixture where the precursor compounds are fully dissolved and/or evenly dispersed.

In one example, two or more metal-containing precursors are mixed into a liquid mixture for obtaining a final reaction product of a mixed metal oxide material. Exemplary metal-containing precursors include, but are not limited to, metal salts, lithium-containing compound, cobalt-containing compound, manganese-containing compound, nickel-containing compound, lithium sulfate ($Li_2SO_4$), lithium nitrate ($LiNO_3$), lithium carbonate ($Li_2CO_3$), lithium acetate ($LiCH_2COO$), lithium hydroxide (LiOH), lithium formate ($LiCHO_2$), lithium chloride (LiCl), cobalt sulfate ($CoSO_4$), cobalt nitrate ($Co(NO_3)_2$), cobalt carbonate ($CoCO_3$), cobalt acetate ($Co(CH_2COO)_2$), cobalt hydroxide ($Co(OH)_2$), cobalt formate ($Co(CHO_2)_2$), cobalt chloride ($CoCl_2$), manganese sulfate ($MnSO_4$), manganese nitrate ($Mn(NO_3)_2$), manganese carbonate ($MnCO_3$), manganese acetate ($Mn(CH_2COO)_2$), manganese hydroxide ($Mn(OH)_2$), manganese formate ($Mn(CHO_2)_2$), manganese chloride ($MnCl_2$), nickel sulfate ($NiSO_4$), nickel nitrate ($Ni(NO_3)_2$), nickel carbonate ($NiCO_3$), nickel acetate ($Ni(CH_2COO)_2$), nickel hydroxide ($Ni(OH)_2$), nickel formate ($Ni(CHO_2)_2$), nickel chloride ($NiCl_2$), aluminum (Al)-containing compound, titanium (Ti)-containing compound, sodium (Na)-containing compound, potassium (K)-containing compound, rubidium (Rb)-containing compound, vanadium (V)-containing compound, cesium (Cs)-containing compound, chromium (Cr)-containing compound, copper (Cu)-containing compound, magnesium (Mg)-containing compound, iron (Fe)-containing compound, and combinations thereof, among others.

Not wishing to be bound by theory, it is contemplated that, in order to prepare an oxide material with two or more different metals, all of the required metal elements are first mixed into a liquid mixture (e.g., into a solution, a slurry, or a gel mixture) using two or more metal-containing precursor compounds as the sources of each metal element such that the two or more different metals can be mixed uniformly at desired ratio. As an example, to prepare a liquid mixture of an aqueous solution, slurry, or gel, one or more metal salts with high water solubility can be used. For example, metal nitrate, metal sulfate, metal chloride, metal acetate, metal formate can be used. Organic solvents, such as alcohols, isopropanol, etc., can be used to dissolve or disperse metal-containing precursors with low water solubility. In some cases, the pH value of the liquid mixture can be adjusted to increase the solubility of the one or more precursor compounds. Optionally, chemical additives, gelation agents, and surfactants, such as ammonia, EDTA, etc., can be added into the liquid mixture to help dissolve or disperse the precursor compounds in a chosen solvent.

Desired size of the one or more streams of droplets can be adjusted by adjusting the sizes of liquid delivery/injection channels within the power jet module. Size of the one or more streams of droplets ranging from a few nanometers to a few hundreds of micrometers can be generated. Suitable droplet sizes can be adjusted according to the choice of the mist generator used, the liquid mixture compounds, the temperature of the dispersion chamber, the flow rate of the gas, and the residence time inside the dispersion chamber. As an example, a mist with liquid droplet sizes between one tenth of a micron and one millimeter is generated inside the dispersion chamber.

At Step 440, the one or more streams of droplets is jetted into and flowed inside a dispersion chamber of the processing system via one or more power jet modules. In one configuration, the one or more power jet modules are connected to a liquid source to store desired amounts of liquid mixture compounds and an electronic control unit for directing and controlling the delivery of liquid mixture compounds from the liquid source to the power jet.

In another configuration, the liquid mixture within the liquid source can be pumped by the pump from the liquid source to the power jet. Pumping of the liquid mixture by the pump can be configured, for example, continuously at a desired delivery rate (e.g., adjusted by a metered valve or other means) to achieve good process throughput of processing system. In another configuration, the power jet is positioned outside the dispersion chamber and the stream generated therefrom is delivered to the dispersion chamber via a chamber inlet.

In one embodiment, the one or more power jet modules adapted to jet the liquid mixture into one or more streams of droplets and to jet the one or more streams of droplets into the processing system. In another embodiment, the streams of droplets jetted into the dispersion chamber are dispersed with the flows of one or more gases in the dispersion angle ($\alpha$) with each other and forming the one or more flows of gas-liquid mixtures containing the gas flows of one or more gases and the streams of droplets. The one or more gases and the one or more streams of droplets are flowed into each other at a dispersion angle ($\alpha$) of between zero degree and about 180 degree.

At Step 450, one or more gases are dispersed with the one or more streams of droplets into a gas-liquid mixture at a temperature $T_D$ inside a dispersion chamber of the processing system. In one aspect, the temperature $T_D$ is maintained at between 20° C. and 400° C. The one or more streams of droplets is mixed within the dispersion chamber by flowing the one or more gases continuously and/or at adjustable, variable flow rates. At the same time, the streams of droplets jetted from the liquid mixture are carried by the gas, as a thoroughly-mixed gas-liquid mixture, through a path within the dispersion chamber, and as more gas is flown in, the gas-liquid mixture is delivered out of the dispersion chamber and continuously delivered to a reaction chamber connected to the dispersion chamber.

At Step 460, a reaction mixture is formed inside the reaction chamber from the one or more heated gases provided by the heating assembly and the gas-liquid mixture of gases and streams of droplets provided from the dispersion chamber such that the reaction mixture is processed at a reaction temperature inside the reaction chamber into a product material.

In one embodiment, various gases flown within the processing systems 100, 200 are heated and the thermal energy of the heated gas can be served as the energy source for carrying out drying, reacting, oxidation, reduction, and/or other reactions inside the processing system. The gases can be heated to a temperature of 20° C. or higher, such as 100° C. or higher, or 40° C. or higher, e.g., between 100° C. to 1000° C., between 400° C. to 900° C., etc., by passing through a suitable heating mechanism, such as electricity powered heater, fuel-burning heater, etc. Alternatively, heating, drying, and/or other reactions inside the processing system can be carried out by heating the chamber directly or each part of the processing system directly, such as heating the chamber body of the reaction chamber or dispersion chamber.

The advantages of using heated gas as heat source are fast heat transfer, high temperature uniformity, and easy to scale up, among others. The reaction chambers may be any chambers, furnaces with enclosed chamber body, such as a dome type ceramic chamber, a quartz chamber, a tube chamber, etc. Optionally, the chamber body is made of thermal insulation materials (e.g., ceramics, etc.) to prevent heat loss during drying and/or other reactions within the chamber.

The gas-liquid mixture formed from the one or more gases and the one or more streams of droplets is delivered into a reaction chamber to undergone reactions. Reactions of the gas-liquid mixture within the reaction chamber may include any of oxidation, reduction, decomposition, combination reaction, phase-transformation, re-crystallization, single displacement reaction, double displacement reaction, combustion, isomerization, and combinations thereof. For example, the one or more flows of gas-liquid mixtures may be oxidized, such as oxidizing the liquid mixture compounds into an oxide material. Alternatively, a desired crystal structure of reaction mixtures is obtained from a reaction of the one or more flows of gas-liquid mixtures within the reaction chamber.

One embodiment of the invention provides that the one or more gases used may be a gas that mix well with the streams of droplets into a gas-liquid mixture and process the gas-liquid mixture without reacting to the streams of droplets. However, in some cases, the chemicals in the streams of droplets may react to the gas and/or to each other to certain extent during processing and/or other reactions inside the chamber, depending on the temperature and the chemical composition of the streams of droplets. In addition, the residence time of the gas-liquid mixture of thoroughly mixed streams of droplets compounds within each of the chambers of the processing system is adjustable and may be, for example, between one second and one hour, depending on the flow rate of the one or more gas, and the length of the path that the streams of droplets has to flow through within the dispersion chamber.

In one embodiment, the gas-liquid mixtures and the one or more heated gases may collide with each other inside the reaction chamber. The flows of gas-liquid mixtures and the one or more heated gases are mixed together to form a reaction mixture for a duration of a reaction time inside the reaction chamber where the reaction mixture comprises gas flows, the streams of droplets and heated gases. In another embodiment, the reaction chamber of the processing system can be heated to the reaction temperature $T_R$ by using the one or more heated gases which are heated to a temperature of between 100° C. and 1400° C. In one aspect, the one or more heated gases are delivered by the gas delivery element to mix with the one or more flows of the gas-liquid mixture at each other at a angle ($\beta$) of between zero degree and about 180 degree inside the reaction chamber.

Examples: Assisted Gas Flow inside a Reaction Chamber of a Processing System

Experiments are conducted using a processing system and gas flows are delivered through a heating assembly into a reaction chamber of the processing system and the paths of one and more gas flows are traced and measured.

Figure 5:
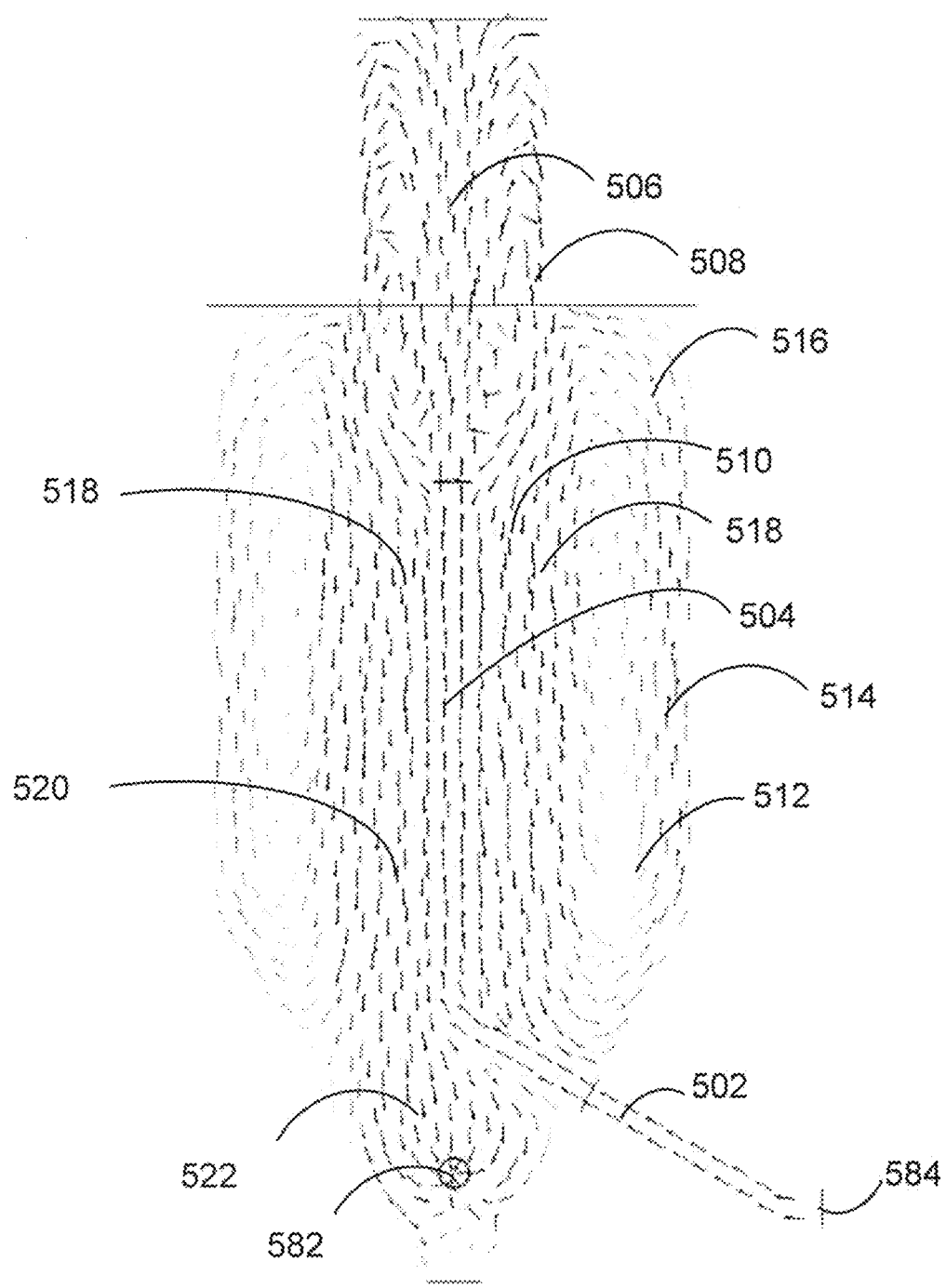
FIG. 5 illustrates velocity vector within said apparatus that can be used in the processing system according to one embodiment of the invention.

FIG. 5 is a sectional view of the results of an experiment illustrating velocity vector of one or more heated gas delivered into the processing system. In this example, one or more heated gases, estimated at temperature 800° C. is delivered through an opening 582 on the chamber wall of the reaction chamber at a speed of 13.28 m/s into the processing system and out of the processing system from a system outlet 584. Multiple vectors 502, 504, 506, 508, 510, 512, 514, 516, 518, 520, 522, as represented by multiple arrows, indicate the direction of the gas flows and the magnitude of the gas flows at each of the positions of the vectors to simulate the heated gases $F_6$. The direction of the gas flow at a specific position is shown as the direction of the vectors 502-522, and the magnitude of the velocity of the gas flow is shown as the thickness of the vectors 502 to 522.

Figure 6:
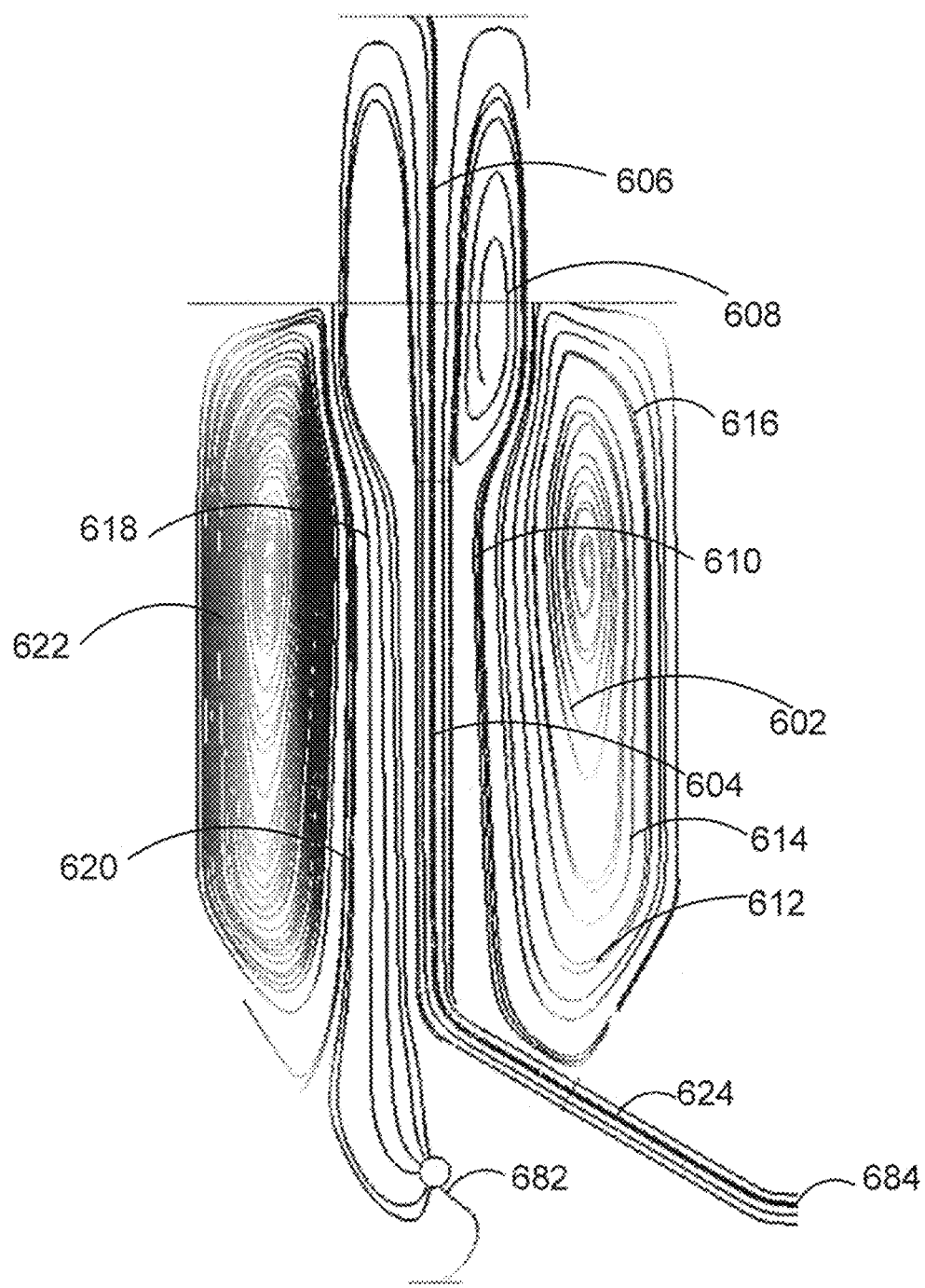
FIG. 6 illustrates velocity streamline within said apparatus that can be used in the processing system according to one embodiment of the invention.

FIG. 6 is a sectional view of the results of an experiment illustrating the distribution of equal velocity lines after one or more heated gases are delivered into the reaction chamber. In this example, flows of heated gases $F_6$, estimated at temperature 900° C. are delivered through an opening 682 on the chamber wall of the reaction chamber at a speed of 1 m/s or larger, such as about 10 m/s or larger, about 30 m/s or larger,) into the reaction chamber and out of the processing system from a system outlet 684. In FIG. 6, each line is formed by connecting points that have the same velocity, and each of lines 602, 604, 606, 608, 610, 612, 614, 616, 618, 620, 622, 624 represents each point on the line have the same or equal velocity at the time indicated, and the velocity of each line can be 0.1 m/s or larger, and can range from 0.5 m/s to 2.0 m/s, or from 0.1 m/s to 5 m/s, or from 0.1 m/s to 10 m/s. For example, an input speed of about 13 m/s, then velocity of each line can range from 8 to 20 m/s. Further, in FIG. 6, the majority of the lines 602, 604, 606, 608, 610, 612, 614, 616, 618, 620, 622, 624 forms a loop inside the reactor chamber to indicate the increased flight time of the flows of the gases carrying liquid droplets inside the reaction chamber and help the chemical reaction process therein, thereby forming uniform particles inside the reaction chamber. For example, the ratio of the velocity in line 602 and the speed of $V_{s1}$ m/s measured can be between 1:15 and about 1:4. In addition, line 602, line 612, line 614; line 616 and line 622 can have the same or similar velocity. The ratio of the velocity in line 608 and the speed of $V_{S1}$ m/s measured can be between 1:8 and about 1:3. In addition, line 608 and line 610 have the same or similar velocity. The ratio of the velocity in line 618 and the speed of $V_{S1}$ m/s measured can be between 1:6 and about 1:2. The ratio of the velocity in line 624 and the speed of $V_{s1}$ m/s can be between 1:1 and about 1:1.2. In addition, line 604 and line 606, and line 624 have the same or similar velocity.

Figure 7:
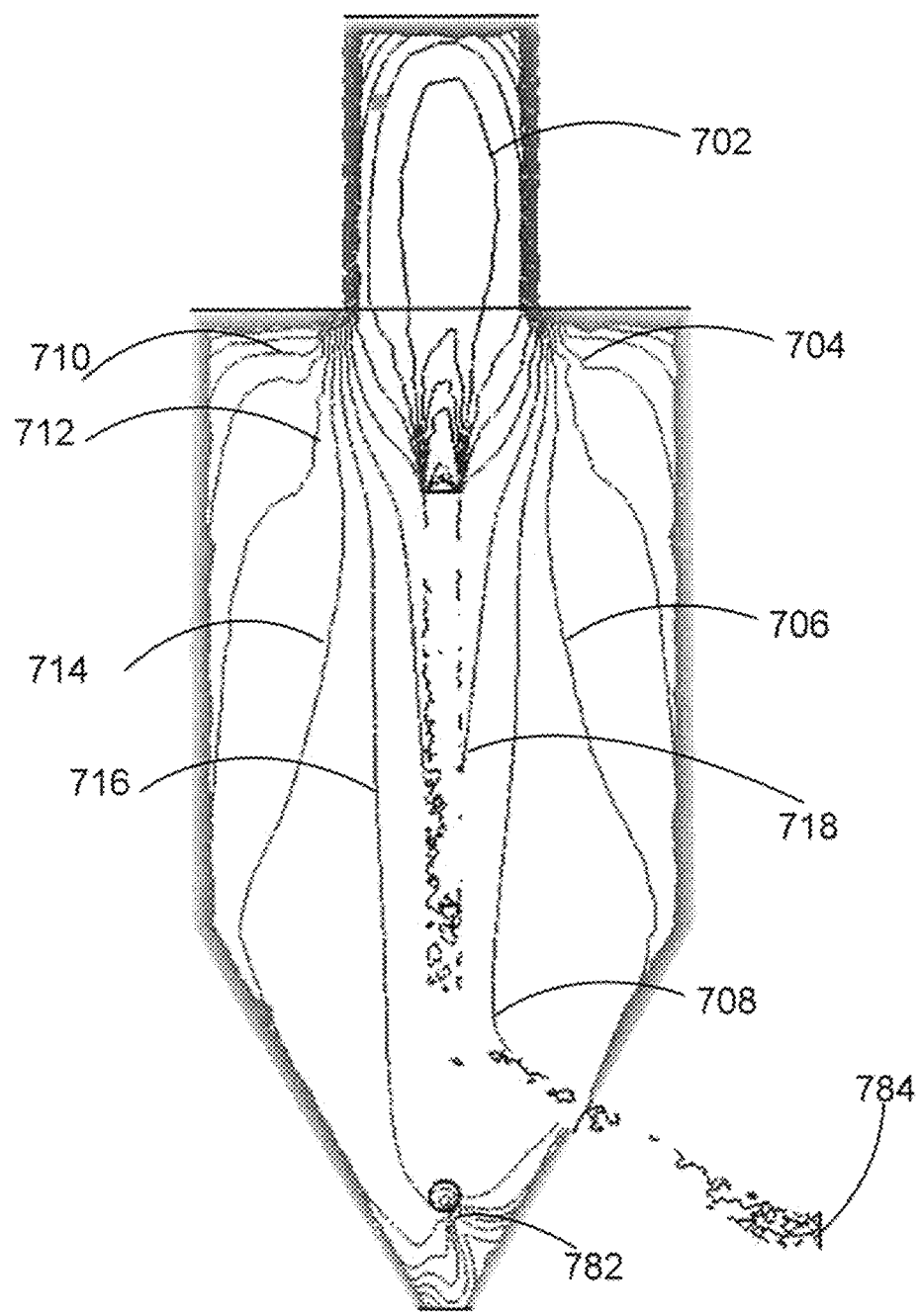
FIG. 7 illustrates temperature distribution of said apparatus can be used in the processing system with assisted gas flow inside a reaction chamber according to one embodiment of the invention.

FIG. 7 is a sectional view of the results of an experiment illustrating the distribution of equal temperature lines after one or more heated gases are delivered into the reaction chamber. In this example, flows of heated gases $F_6$, estimated at temperature 800° C. are delivered through an opening 782 at a speed of 13.28 m/s into the reaction chamber where the gas inlet flow rate is 800 CFM (ft³/min) and out of the reaction chamber from a system outlet 784. In FIG. 7, each line is formed by connecting points that have the same temperature, and each of lines 702, 704, 706, 708, 710, 712, 714, 716, 718 represents each point on the line have the same or equal temperature at the time indicated, which helps to form uniform particles. The temperatures in FIG. 7 can range from 50° C. degree to 900° C. degree. In FIG. 7, the temperature of each point within the space between neighboring lines ranges from 0 to 20° C. degree. The temperature on line 702 represents 720° C., the line 704 represents 540° C., the temperature on line 706 represents 580° C., the line 708 represents 600° C., the temperature on line 710 represents 540° C., the temperature on line 712 represents 580° C., the temperature on line 714 represents 600° C., the temperature on line 716 represents 620° C., the temperature on line 718 represents 640° C.

Figure 8:
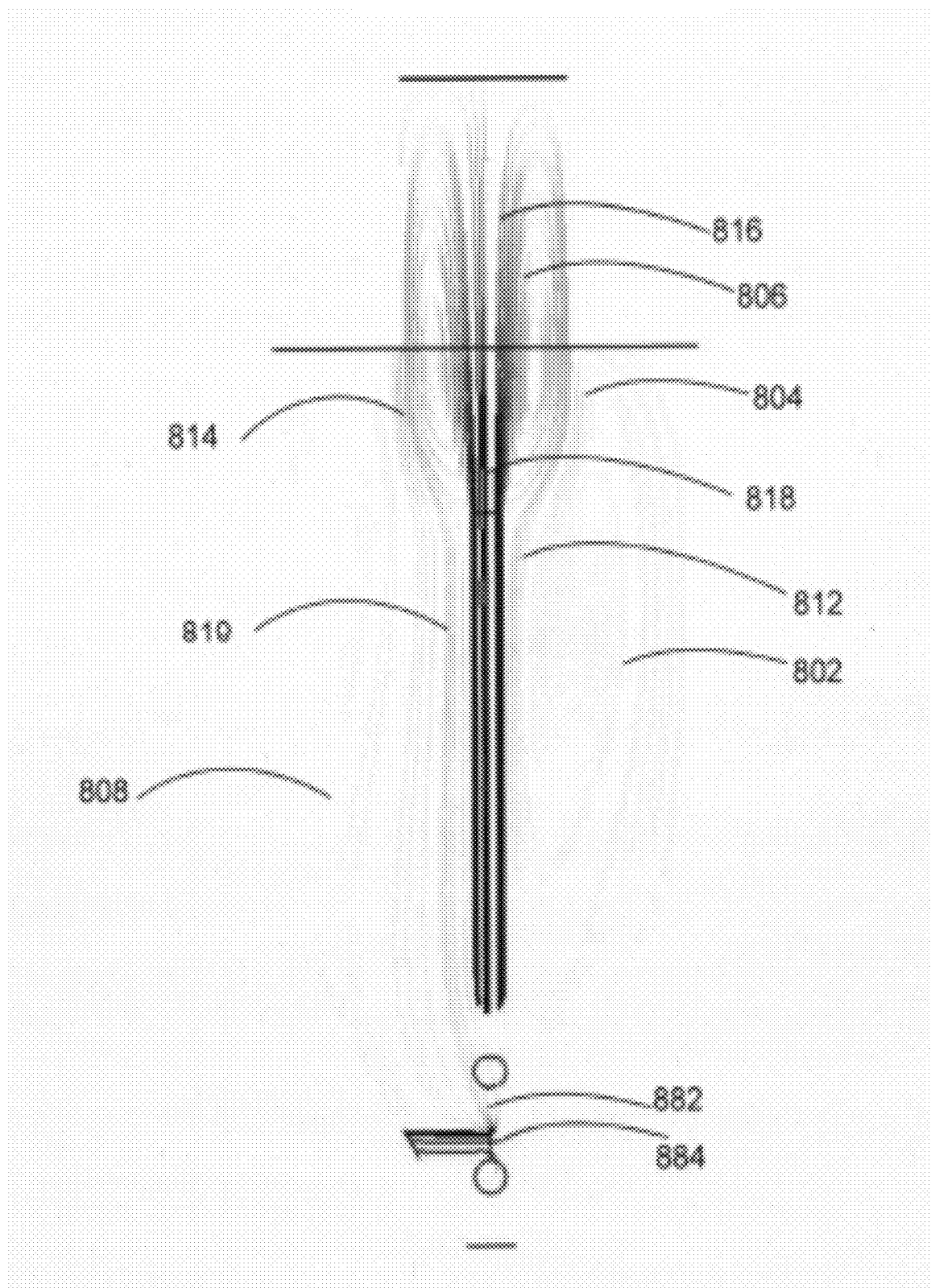
FIG. 8 illustrates velocity streamline within said apparatus that can be used in the processing system according to one embodiment of the invention.

FIG. 8 is a sectional view of the results of an experiment illustrating the distribution of equal velocity lines after one or more heated gases are delivered into the reaction chamber. In this example, flows of heated gases $F_6$, estimated at temperature 800° C. are delivered through an opening 882 at a speed of 5.8 m/s into the reaction chamber where the gas inlet flow rate is 800 CFM (ft³/min) and out of the reaction chamber from a system outlet 884. In FIG. 8, each line is formed by connecting points that have the same velocity, and each of lines 802, 804, 806, 808, 810, 812, 814, 816 represents each point on the line have the same or equal velocity at the time indicated, which helps to form uniform particles. In FIG. 8, the velocity on lines 802, 804, 806, 808, 810, 812, 814, 816 forms a loop and all the points on the same line has the same velocity where the ratio of the velocity in lines and the speed of $V_{s2}$ m/s measured through the opening 882 of the chamber wall of the reaction chamber can be between 1:200 and about 1:4. For example, line 802, line 804, and line 808 have the same or similar velocity. The ratio of the velocity in line 808 and the speed of $V_{s2}$ m/s measured can be between 1:100 and about 1:40. The ratio of the velocity in line 810 and the speed of $V_{s2}$ m/s can be between 1:60 and about 1:20. In addition, line 810 and line 812 have the same or similar velocity. The ratio of the velocity in line 814 and the speed of $V_{s2}$ m/s can be between 1:25 and about 1:10. The ratio of the velocity in line 816 and the speed of $V_{s2}$ m/s can be between 1:8 and about 1:4.

Figure 9:
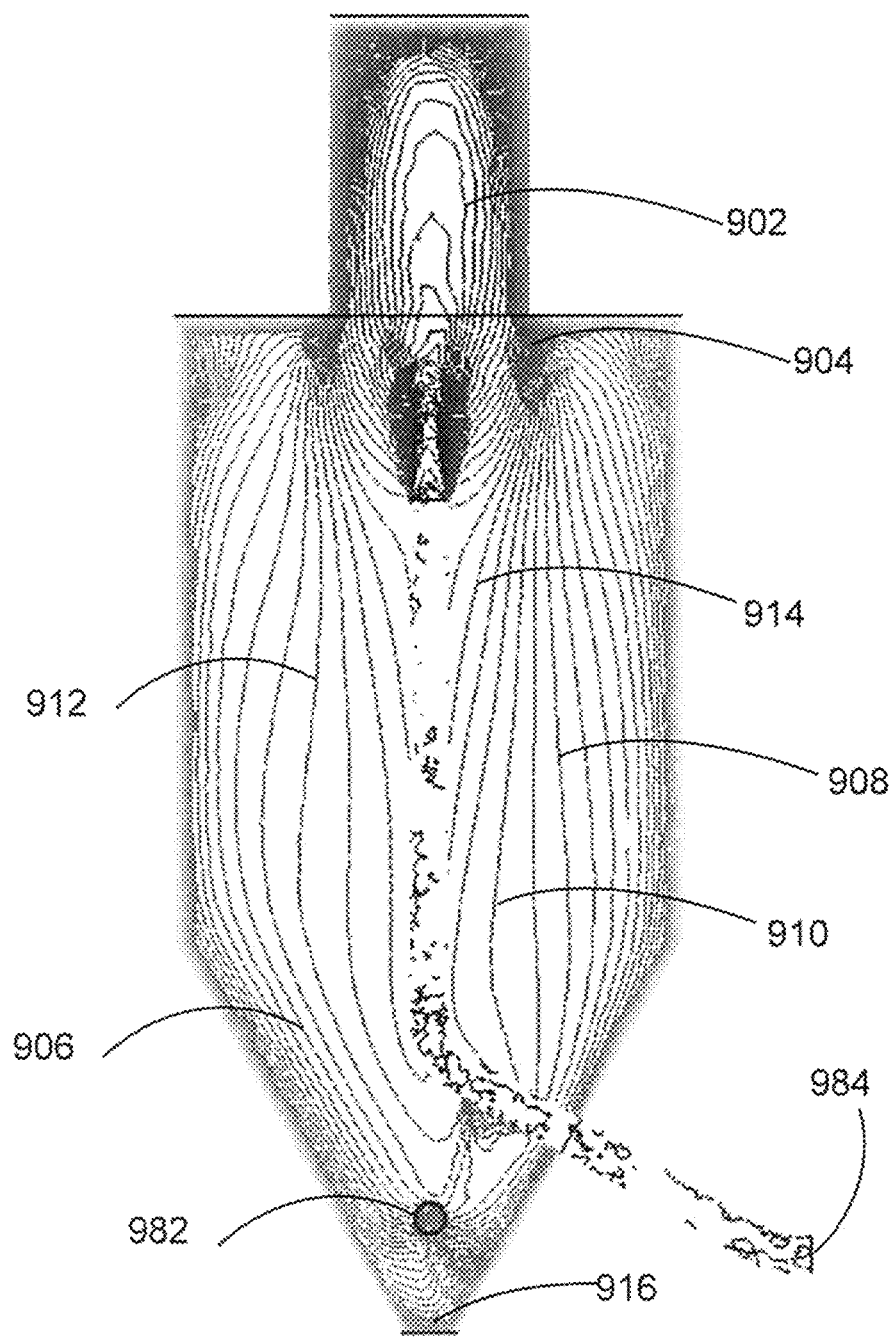
FIG. 9 illustrates temperature distribution of said apparatus can be used in the processing system with assisted gas flow inside a reaction chamber according to one embodiment of the invention.

FIG. 9 is a sectional view of the results of an experiment illustrating the distribution of equal temperature lines after one or more heated gases are delivered into the reaction chamber. In this example, flows of heated gases $F_6$, estimated at temperature 800° C. are delivered through an opening 982 at a speed of 5.8 m/s into the reaction chamber where the gas inlet flow rate is 350CFM (ft³/min) and out of the reaction chamber from a system outlet 984. In FIG. 9, each line is formed by connecting points that have the same temperature, and each of lines 902, 904, 906, 908, 910, 912, 914, 916 represents each point on the line have the same or equal temperature at the time indicated, which helps to form uniform particles. The temperatures in FIG. 9 can range from 50° C. degree to 900° C. degree. In FIG. 9, the temperature of each point within the space between neighboring lines ranges from 0 to 12° C. degree. The temperature on line 902 represents 680° C., the temperature on line 904 represents 620° C., the temperature on line 906 represents 560° C., the temperature on line 908 represents 560° C., the temperature on line 910 represents 584° C., the temperature on line 912 represents 584° C., and the temperature on line 914 represents 620° C.

While the foregoing is directed to embodiments of the present invention, other and further embodiments of the invention may be devised without departing from the basic scope thereof, and the scope thereof is determined by the claims that follow.

What is claimed:

1. A processing system of producing a product material, comprising:
    one or more first gas lines;
    a system inlet connected to the one or more first gas lines to deliver one or more first gas flows into the processing system;
    one or more power jet modules adapted to jet the liquid mixture into one or more streams of droplets and to jet the one or more streams of droplets into the processing system;

a dispersion chamber adapted to be connected to the one or more power jet modules and to disperse the one or more streams of droplets with the one or more first gas flows into a gas-liquid mixture;

a reaction chamber adapted to process a reaction mixture into the product material; and a heating assembly comprising:
 a second gas line being connected to an opening of a chamber wall of the reaction chamber for delivering one or more second gas flows into the reaction chamber; and
 a gas delivery element being connected to the second gas line and positioned inside the reaction chamber, wherein the gas delivery element of the heating assembly is positioned upwardly inside the reaction chamber, wherein the reaction mixture comprises:
  the one or more first gas flows;
  the one or more second gas flows; and
  the one or more streams of droplets.

2. The processing system of claim 1, wherein the one or more first gas flows and the one or more streams of droplets are flowed into each other at a dispersion angle ($\alpha$) of between zero degree and about 180 degrees.

3. The processing system of claim 1, wherein the gas delivery element is positioned inside the reaction chamber to reach an entry region of the reaction chamber where the entry region is connected to the dispersion chamber of the processing system.

4. The processing system of claim 1 wherein the one or more second gas flows are delivered by the gas delivery element to mix with one or more flows of the gas-liquid mixture at each other at an angle ($\beta$) of between zero degrees and about 180 degrees inside the reaction chamber.

5. The processing system of claim 4, wherein the dispersion angle ($\beta$) is 180 degrees.

6. The processing system of claim 1, wherein the processing system further comprises an electronic control center.

7. The processing system of claim 1, wherein the one or more first gas flows delivered through the one or more first gas lines are maintained at a first temperature, and the one or more second gas flows delivered through the gas delivery element of the heating assembly is maintained at a second temperature, and wherein the second temperature is higher than the first temperature.

8. The processing system of claim 7, wherein the first temperature of the one or more first gas flows is maintained between 20° C. and 400° C.

9. The processing system of claim 7, wherein the second temperature is maintained at a temperature of between 100° C. and 1400° C.

10. A processing system of producing a product material, comprising:
 one or more first gas lines;
 a system inlet connected to the one or more first gas lines to deliver one or more first gas flows into the processing system;
 one or more power jet modules adapted to jet the liquid mixture into one or more streams of droplets and to jet the one or more streams of droplets into the processing system;
 a dispersion chamber adapted to be connected to the one or more power jet modules and to disperse the one or more streams of droplets with the one or more first gas flows into a gas-liquid mixture, wherein the one or more first gas flows and the one or more streams of droplets are flowed into each other at an dispersion angle ($\alpha$) of between zero degree and about 180 degree;
 a reaction chamber adapted to process a reaction mixture into the product material; and
 a heating assembly comprising:
  a second gas line being connected to an opening of a chamber wall of the reaction chamber for delivering one or more second gas flows into the reaction chamber; and
  a gas delivery element being connected to the second gas line and positioned inside the reaction chamber, wherein the gas delivery element of the heating assembly is positioned upwardly inside the reaction chamber,
  wherein the reaction mixture comprises the one or more first gas flows, the one or more second gas flows, and the one or more streams of droplets, and
  wherein the one or more second gas flows are delivered by the gas delivery element to mix with one or more flows of the gas-liquid mixture at each other at an angle ($\beta$) of between zero degree and about 180 degree inside the reaction chamber.

11. The processing system of claim 10, wherein the one or more first gas flows delivered through the one or more first gas lines are maintained at a first temperature, and the one or more second gas flows delivered through the gas delivery element of the heating assembly is maintained at a second temperature, and wherein the second temperature is higher than the first temperature.

12. The processing system of claim 11, wherein the first temperature is maintained at a temperature of between 20° C. and 400° C.

13. The processing system of claim 11, wherein the second temperature is maintained at a temperature of between 100° C. and 1400° C.

14. A processing system of producing a product material, comprising:
 one or more first gas lines;
 a system inlet connected to the one or more first gas lines to deliver one or more first gas flows into the processing system;
 one or more power jet modules adapted to jet the liquid mixture into one or more streams of droplets and to jet the one or more streams of droplets into the processing system;
 a dispersion chamber adapted to be connected to the one or more power jet modules and to disperse the one or more streams of droplets with the one or more first gas flows into a gas-liquid mixture;
 a reaction chamber adapted to process a reaction mixture into the product material; and
 a heating assembly comprising:
  a second gas line being connected to an opening of a chamber wall of the reaction chamber for delivering one or more second gas flows into the reaction chamber; and
  a gas delivery element being connected to the second gas line and positioned inside the reaction chamber, wherein the gas delivery element of the heating assembly is positioned upwardly inside the reaction chamber, wherein the one or more first gas flows and the one or more streams of droplets are flowed into each other at a dispersion angle ($\alpha$) of between zero degree and about 180 degrees, and wherein the reaction mixture comprises:

the one or more first gas flows;
the one or more second gas flows; and
the one or more streams of droplets.

15. The processing system of claim 14, wherein the gas delivery element is positioned at an angle between zero degree to 90 degree to a chamber body of the reaction chamber.

16. The processing system of claim 14, wherein the gas delivery element is positioned inside the reaction chamber to reach an entry region of the reaction chamber where the entry region is connected to the dispersion chamber of the processing system.

17. The processing system of claim 16, wherein the gas-liquid mixture and the one or more second gas flows collide with each other near the entry region inside the reaction chamber.

18. The processing system of claim 14, wherein the one or more second gas flows are delivered by the gas delivery element to mix with one or more flows of the gas-liquid mixture at each other at an angle ($\beta$) of between zero degree and about 180 degrees inside the reaction chamber.

* * * * *